(12) United States Patent
Ooya et al.

(10) Patent No.: US 7,252,522 B2
(45) Date of Patent: Aug. 7, 2007

(54) CARD CONNECTOR

(75) Inventors: Masaaki Ooya, Yokohama (JP); Kouji Kikuchi, Tokyo (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 11/296,412

(22) Filed: Dec. 8, 2005

(65) Prior Publication Data

US 2006/0116013 A1 Jun. 1, 2006

Related U.S. Application Data

(62) Division of application No. 10/611,086, filed on Jul. 2, 2003, now Pat. No. 7,094,082.

(30) Foreign Application Priority Data

Jul. 3, 2002 (JP) .............................. 2002-195068
Jun. 27, 2003 (JP) .............................. 2003-185901

(51) Int. Cl.
*H01R 13/62* (2006.01)

(52) U.S. Cl. ...................................... 439/159

(58) Field of Classification Search ................ 439/157, 439/159, 325, 327, 347
See application file for complete search history.

(56) References Cited

U.S. PATENT DOCUMENTS

| | | | | |
|---|---|---|---|---|
| 3,458,794 A | * | 7/1969 | Bohnstedt et al. | .......... 320/111 |
| 4,109,193 A | * | 8/1978 | Schultheis | ................... 320/109 |
| 5,718,609 A | | 2/1998 | Braun et al. | |
| 5,744,934 A | * | 4/1998 | Wu | ............................. 320/111 |
| 5,957,718 A | | 9/1999 | Cheng et al. | |
| 6,264,506 B1 | | 7/2001 | Yasufuku et al. | |
| 6,390,836 B1 | | 5/2002 | Motegi et al. | |
| 6,558,199 B2 | | 5/2003 | Oguchi | |

FOREIGN PATENT DOCUMENTS

| | | |
|---|---|---|
| CN | 2484597 | 4/2002 |
| JP | 07-153525 | 6/1995 |
| JP | 07-335317 | 12/1995 |
| JP | 08-185929 | 7/1996 |
| JP | 08-250208 | 9/1996 |

(Continued)

OTHER PUBLICATIONS

Co-Pending U.S. Appl. No. 10/611,086; Title: Card Connector U.S. Filing Date: Jul. 2, 2003.

(Continued)

*Primary Examiner*—Phuong Dinh
(74) *Attorney, Agent, or Firm*—Finnegan, Henderson, Farabow, Garrett & Dunner, LLP

(57) ABSTRACT

A card connector of the present invention includes a connector body, a cover member in combination with the connector body, contact terminals arranged in the connector body, and a card-ejection preventing mechanism provided in a card-inserting opening of the connector body, wherein the card-ejection preventing mechanism has a card-stopper cap adapted to be slidable along the card-inserting opening of the connector body, so that the ejection of a card due to the vibration or the shock is prevented and a contact portion is always brought into contact with a card pad section.

10 Claims, 32 Drawing Sheets

FOREIGN PATENT DOCUMENTS

JP 09-223542 8/1997
JP 2001-283978 10/2001

OTHER PUBLICATIONS

Office Action in co-pending U.S. Appl. No. 10/611,086 dated Mar. 22, 2005.
Office Action in Co-Pending U.S. Appl. No. 10/611,086 dated Sep. 21, 2004.
Office Action in co-pending U.S. Appl. No. 10/611,086 dated Mar. 29, 2004.
Patent Abstracts of Japan for JP 07-153525.
Patent Abstracts of Japan for JP 07-335317.
Patent Abstracts of Japan for JP 08-185929.
Patent Abstracts of Japan for JP 08-250208.
Patent Abstracts of Japan for JP 09-223542.
Patent Abstracts of Japan for JP 2001-283978.
I. Kazuyoshi, "Reader for IC Card," Patent Abstracts of Japan of JP 08161439, Jun. 21, 1996.
T. Katsumasa, "Card Reader Writer," Patent Abstracts of Japan of JP 08055259, Feb. 27, 1996.
Official Notice of Rejection of Patent Application No. 2003-185901.

* cited by examiner

CARD CONNECTOR

This is a division of application Ser. No. 10/611,086, filed Jul. 2, 2003 now U.S. Pat. No. 7,094,082, and claims priority from Japanese Patent Applications Nos. 2002-195068, filed Jul. 3, 2002, and 2003-185901, filed Jun. 27, 2003, all of which are incorporated herein by reference.

BACKGROUND OF THE INVENTION

1. Field of the Invention

The present invention relates to a card connector attached to an electronic instrument or an information terminal equipment such as a portable telephone or a home telephone, PDA (a personal digital assistance), a portable type audio set or a camera, particularly to a card connector in which a card such as an IC card or an SD card is inserted.

2. Description of the Related Art

Recently, it has been desired that the function of an electronic instrument or an information terminal equipment, such as a portable telephone or a home telephone, PDA (a personal digital assistance), a portable type audio set or a camera (hereinafter referred to as a portable telephone or the like) is improved.

To improve the function, a card such as an IC card, an SD card or a SIM card, into which an IC element called as an IC chip is incorporated has been used in the portable telephone or the like.

For this reason, a card connector capable of receiving or ejecting such a card as an IC card, an SD card or a SIM card is necessary in the portable telephone or the like.

In the conventional card connector of this type, there is one using a special card elongated in the inserting direction of the card and attached at a tip end thereof with an antenna for the wireless transmission.

Usually, this card is used while projecting the antenna outside from a housing.

If the housing is carelessly dropped down onto a concrete floor while the antenna is projected outside from the housing, an extremely large impact is applied thereto to often break the card connector.

Further, as a general requirement in a market, it is desired that the card connector is low in height and has a sufficient mechanical strength.

To achieve the desired mechanical strength of the card connector, it is necessary, for example, to incorporate a cover member of a metallic plate in an upper surface portion of the connector body.

Also, a similar requirement exists in a so-called reverse type card connector which is reversed during use.

That is, there is a requirement in that the card connector is low in height and has a mechanical strength durable against a torsion of the card, and to achieve such a requirement, a metal sheet is used in the upper surface portion of the card connector.

However, in this card connector, there is no lid for preventing the ejection of the card.

Accordingly, in this card connector, when the card connector in which the card is inserted is dropped down on the floor from a hand, the card may project out from the connector due to the shock or the vibration, and as a result, a problem may often occur in that a contact-touch section comes off from a card-pad section to cause a read error.

SUMMARY OF THE INVENTION

In view of the above-mentioned problem, an object of the present invention is to provide a card connector in which a contact-touch section is prevented from coming off from a card-pad section due to the vibration or the shock so that contacts of the former section with the latter section is maintained by providing a connector body and a cover member combined therewith, and an anti-ejection mechanism having a lid slidable along a card-inserting opening.

To achieve the above object, the inventive card connector comprises a connector body, a cover member in combination with the connector body, contact terminals arranged in the connector body, and a card-ejection preventing mechanism provided in a card-inserting opening of the connector body, wherein the card-ejection preventing mechanism has a card-stopper cap adapted to be slidable along the card-inserting opening of the connector body. Thereby, according to the inventive card connector, when the card is inserted, the card-stopper cap slides along the car-inserting opening to prevent the ejection of card when the card connector is dropped down. Also since the connector body is formed in one-piece with the cover member, a sufficient mechanical strength durable against the shock is obtained and a height of the connector body becomes lower as a whole to reduce a size thereof.

The above and other objects, effects, features and advantages of the present invention will become more apparent from the following description of embodiments thereof taken in conjunction with the accompanying drawings.

DETAILED DESCRIPTION OF PREFERRED EMBODIMENTS

First Embodiment

Figure 1:
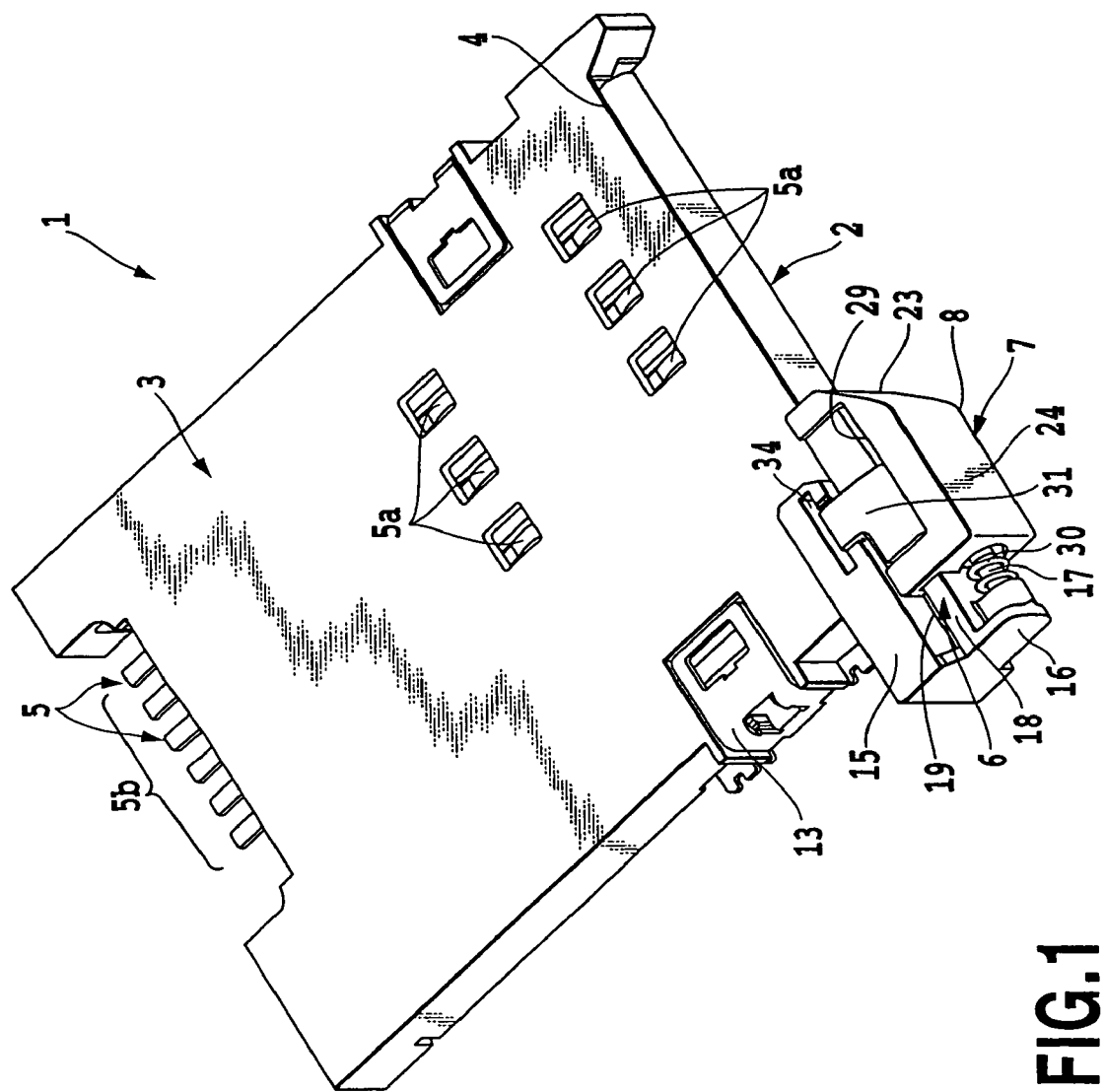
FIG. 1 is a perspective view of a first embodiment according to the present invention, illustrating a state in which a card is not yet inserted and a card-stopper cap is locked.
Figure 2:
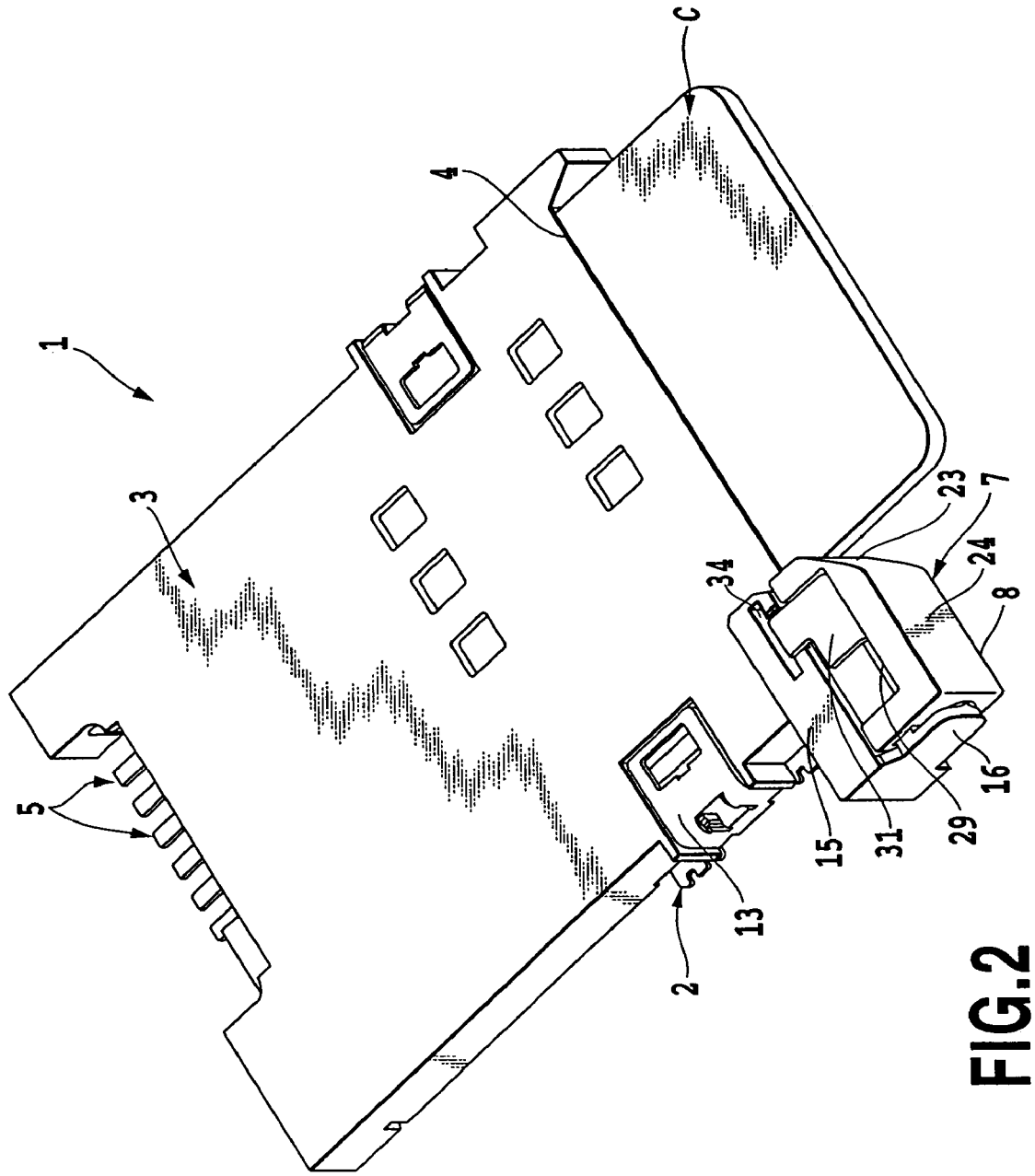
FIG. 2 is a perspective view of the inventive card connector shown in FIG. 1 in which the card is ejected and the card-stopper cap is open.
Figure 3:
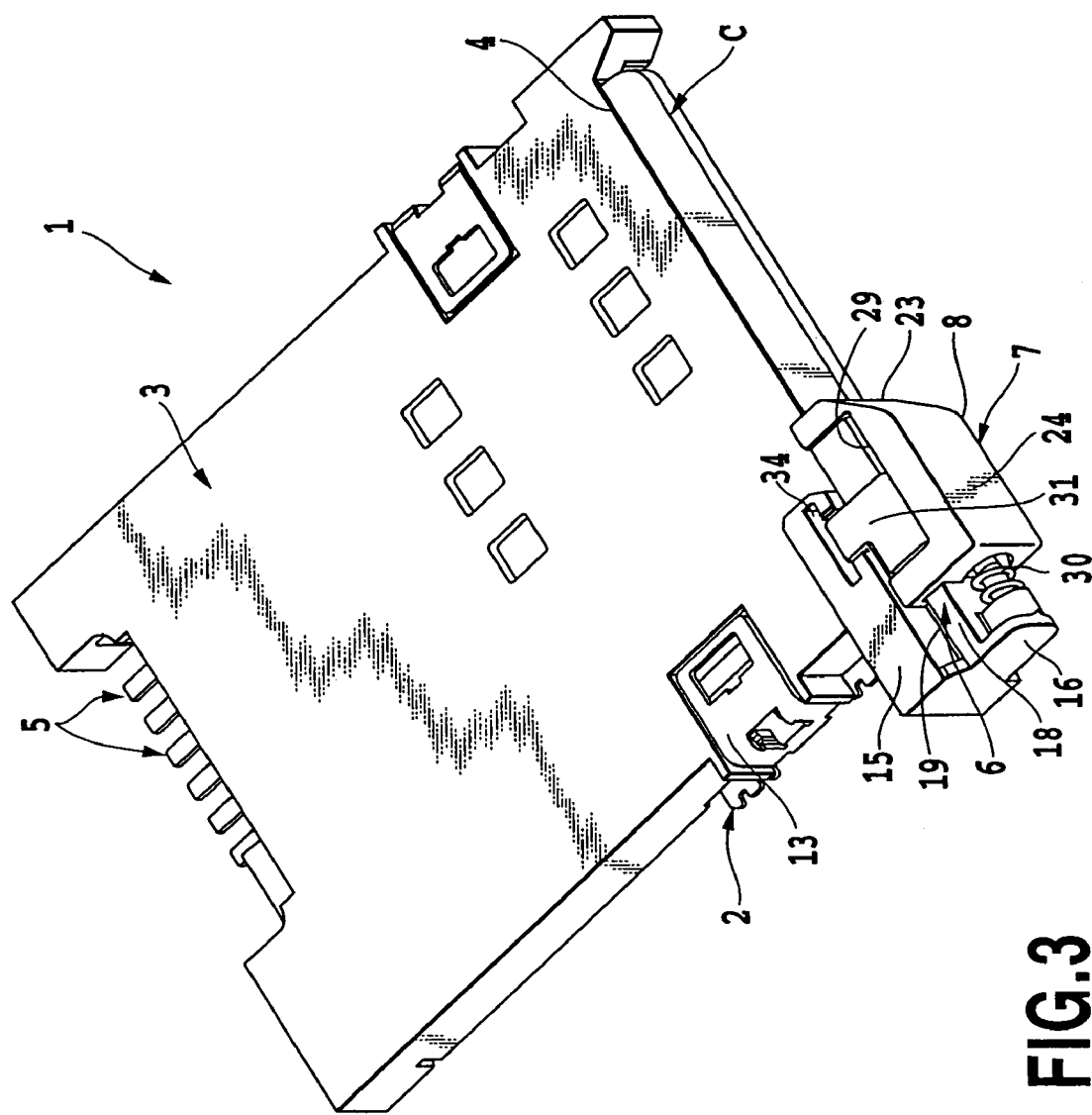
FIG. 3 is a perspective view of the inventive card connector shown in FIG. 2 in which the card is locked and the card-stopper cap is locked.
Figure 4:
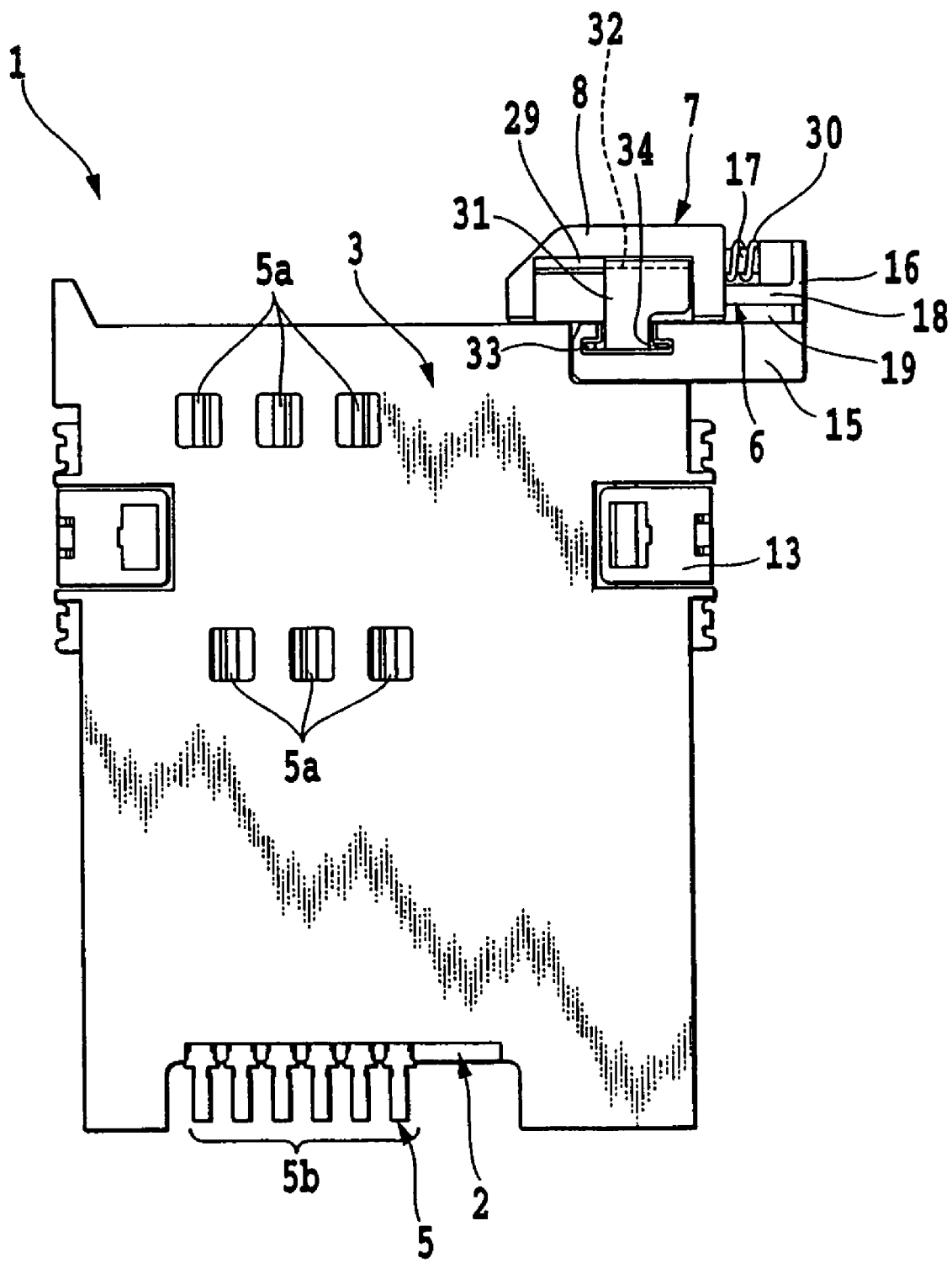
FIG. 4 is a front view of the inventive card connector shown in FIG. 1 in which the card is not yet inserted and the card-stopper cap is locked.
Figure 5:
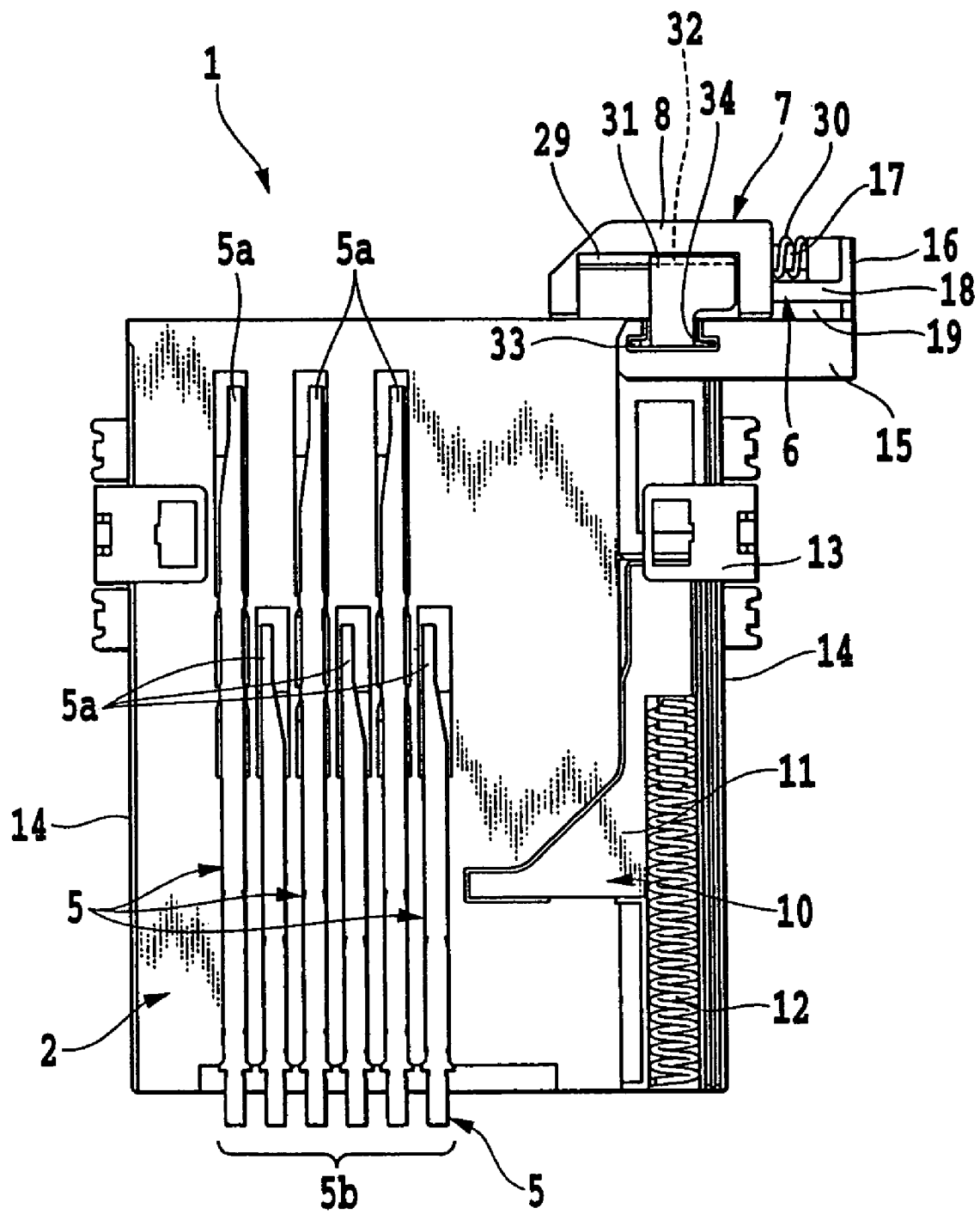
FIG. 5 is a front view of the inventive card connector similar to FIG. 4 in which a cover member is removed.
Figure 6:
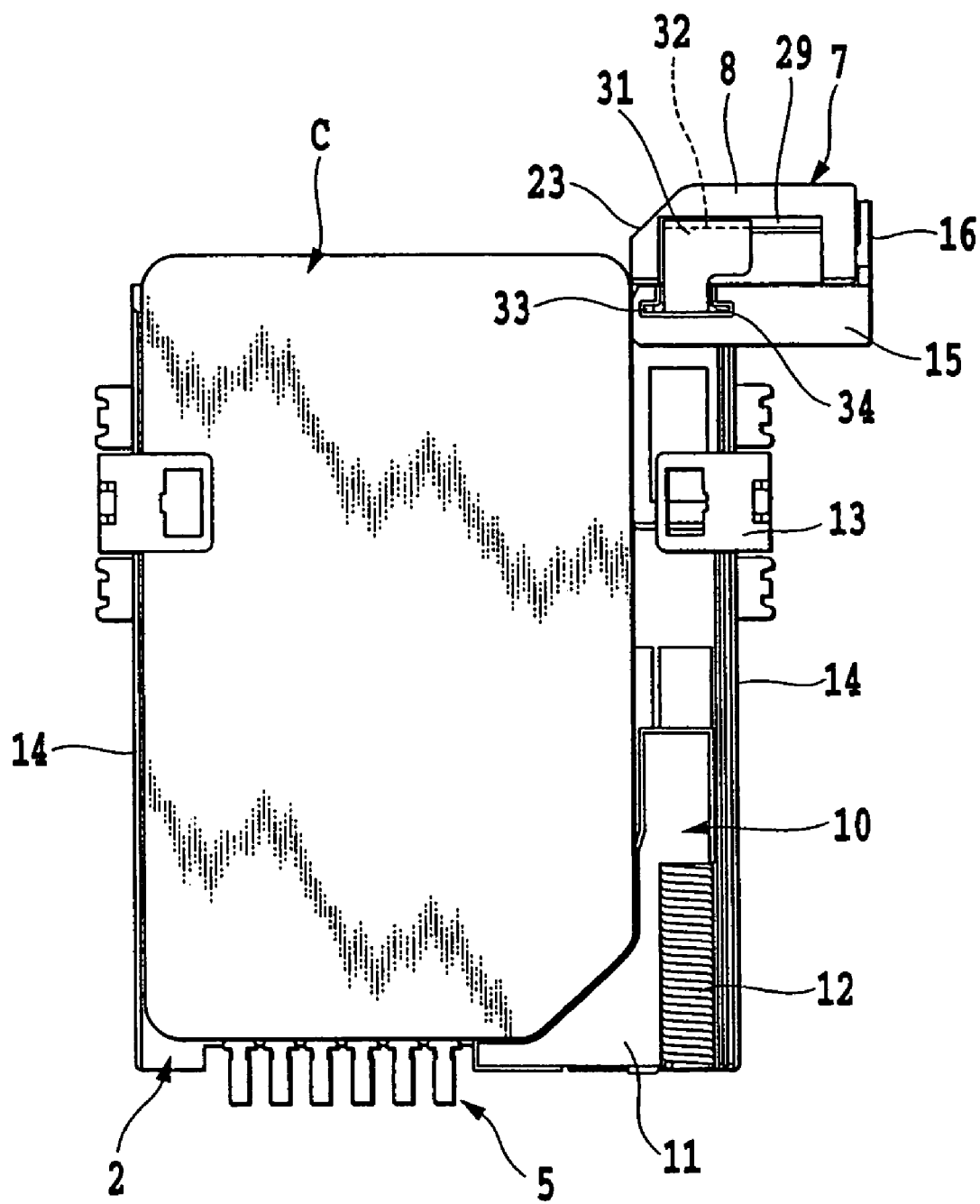
FIG. 6 is a front view of the inventive card connector shown in FIG. 5 in which the card is inserted to the deepest position in the card connector.
Figure 7:
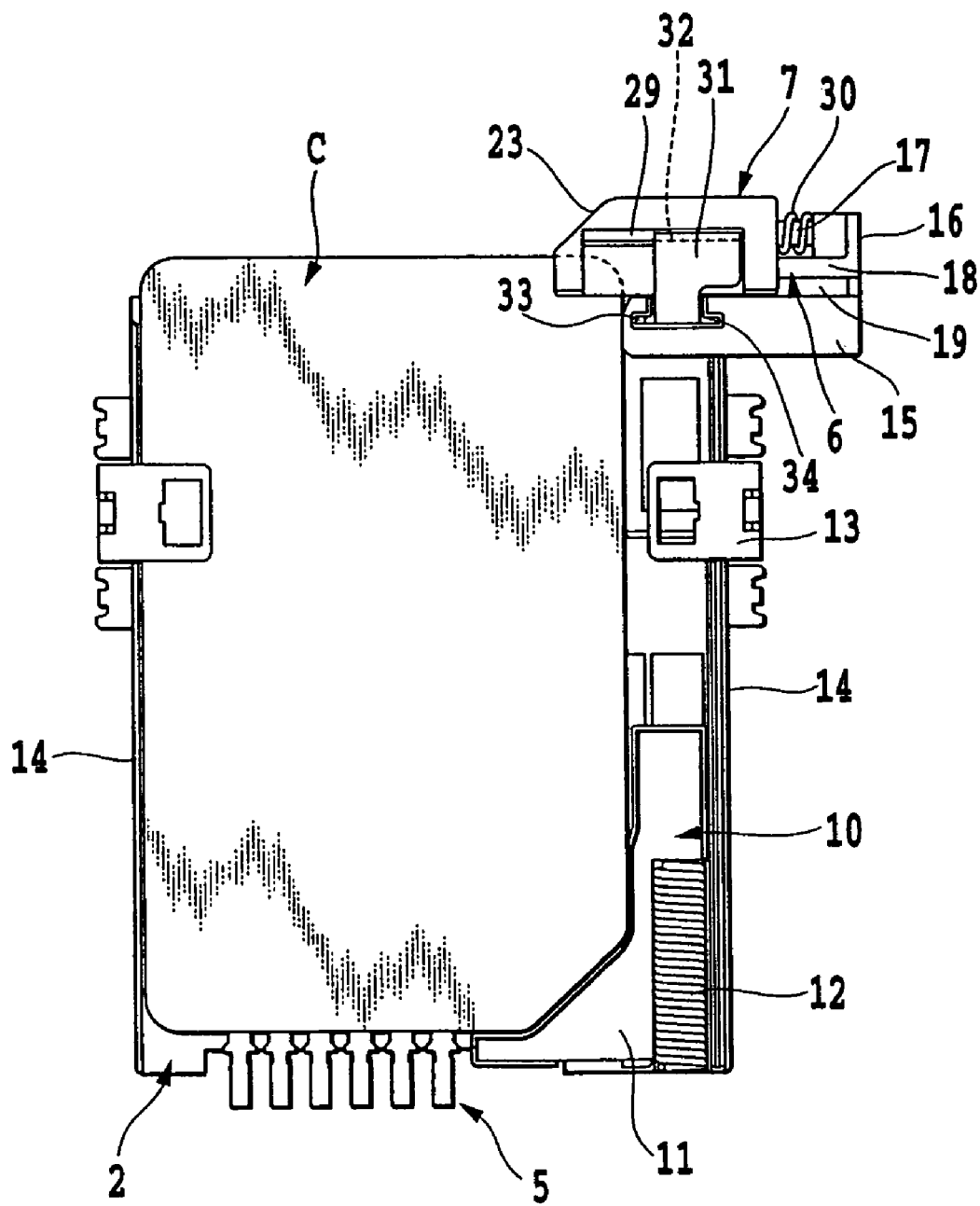
FIG. 7 is a front view of the inventive card connector shown in FIG. 6 in which the card is locked at an ejector-locked position.
Figure 8:
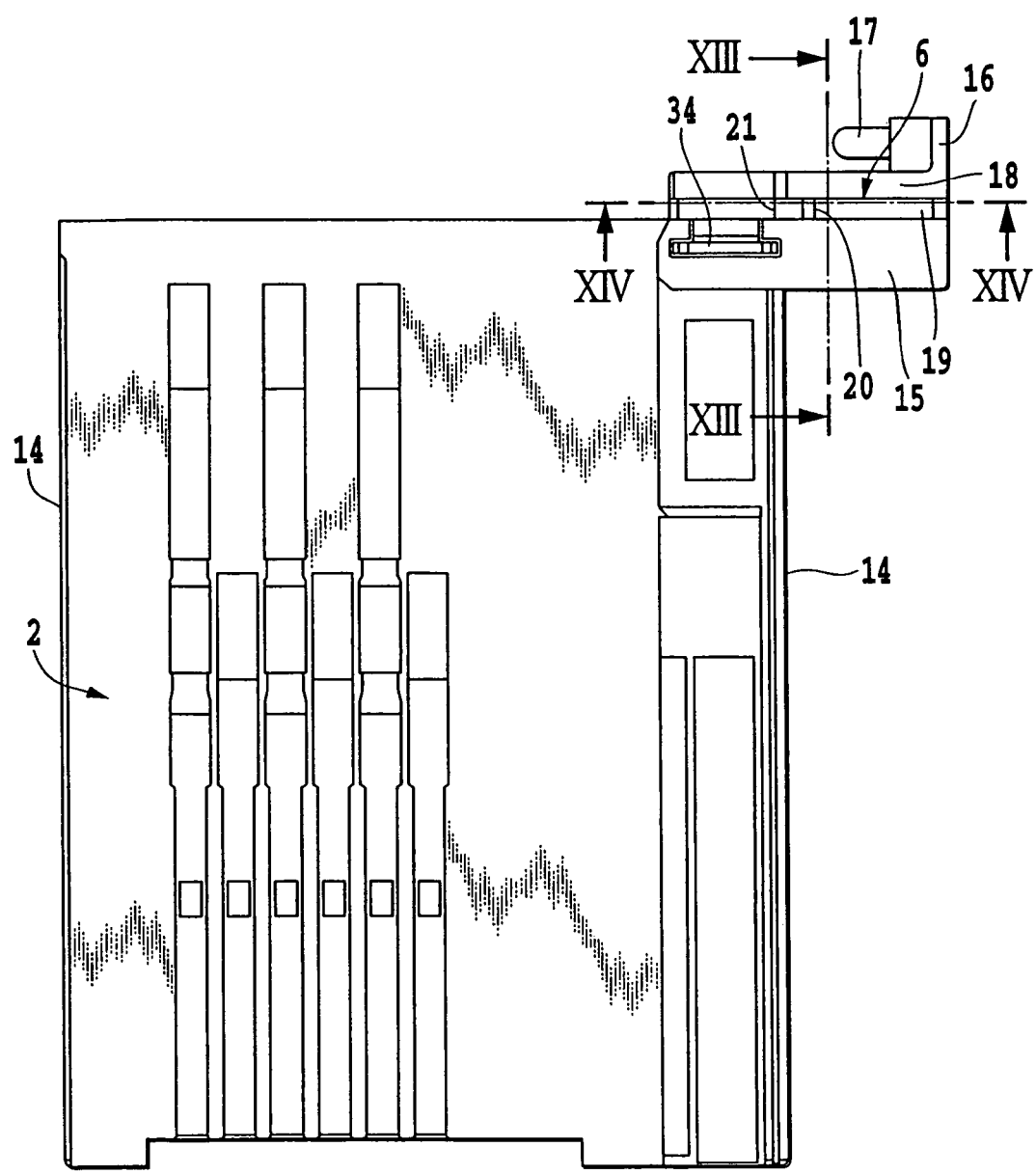
FIG. 8 is a front view of a connector body of the inventive card connector from which is removed the cover member.
Figure 9:
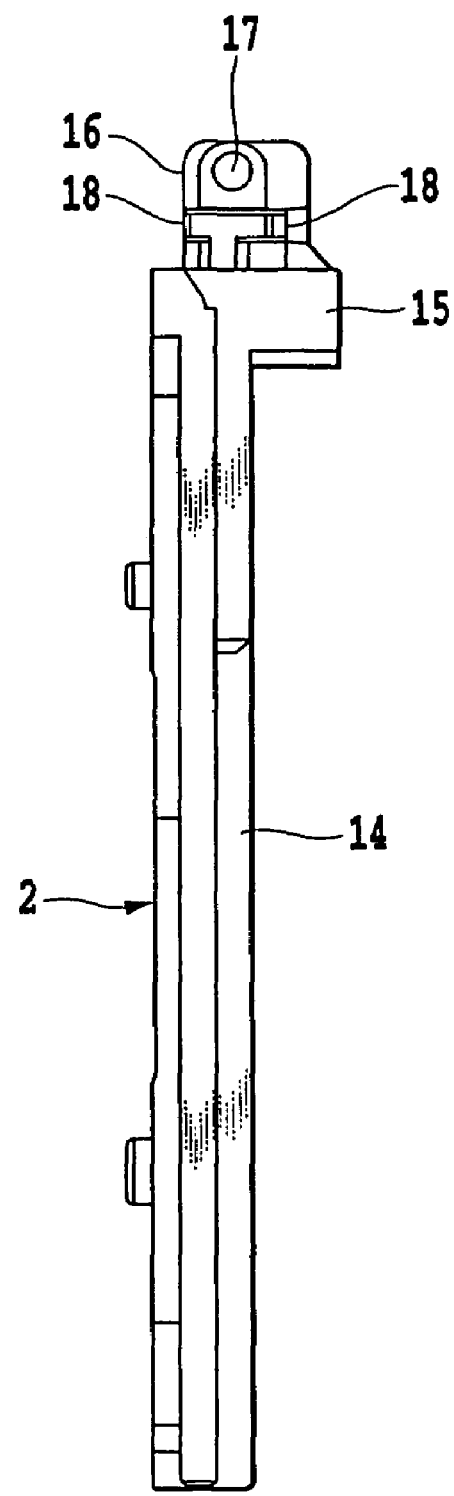
FIG. 9 is a left side view of the connector body shown in FIG. 8.
Figure 10:
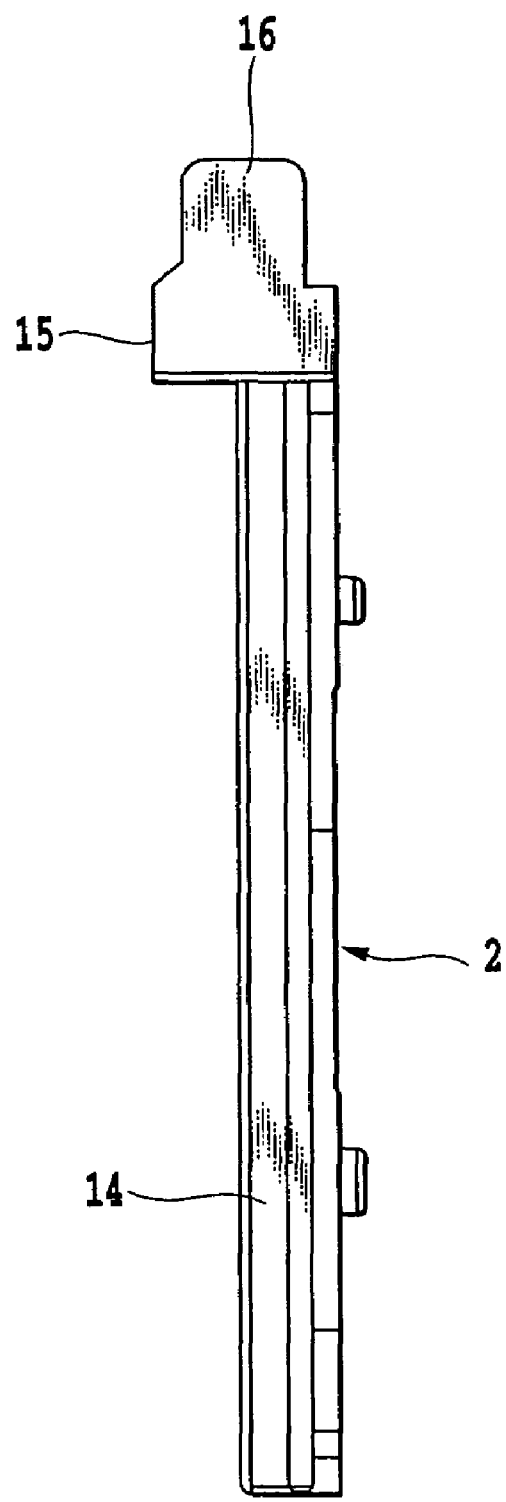
FIG. 10 is a right side view of the connector body shown in FIG. 8.
Figure 11:
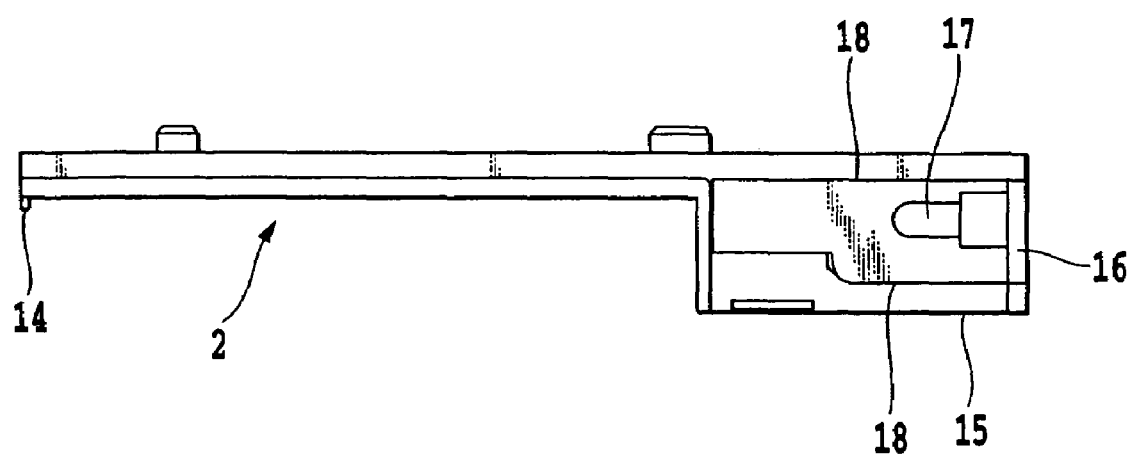
FIG. 11 is a front view of the connector body shown in FIG. 8.
Figure 12:
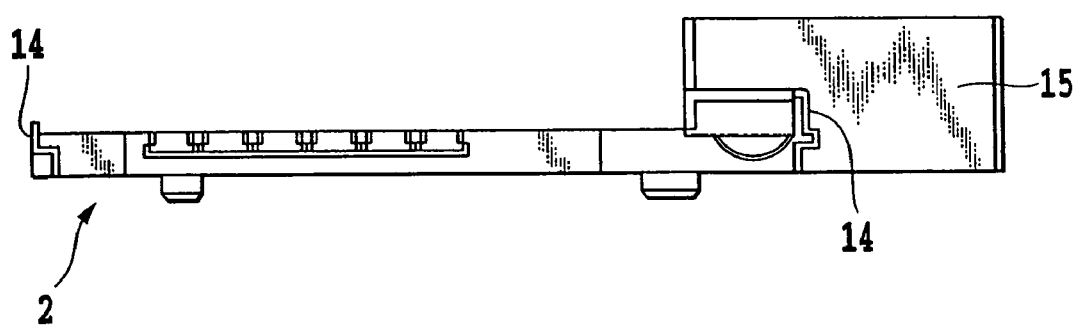
FIG. 12 is a rear view of the connector body shown in FIG. 8.
Figure 13:
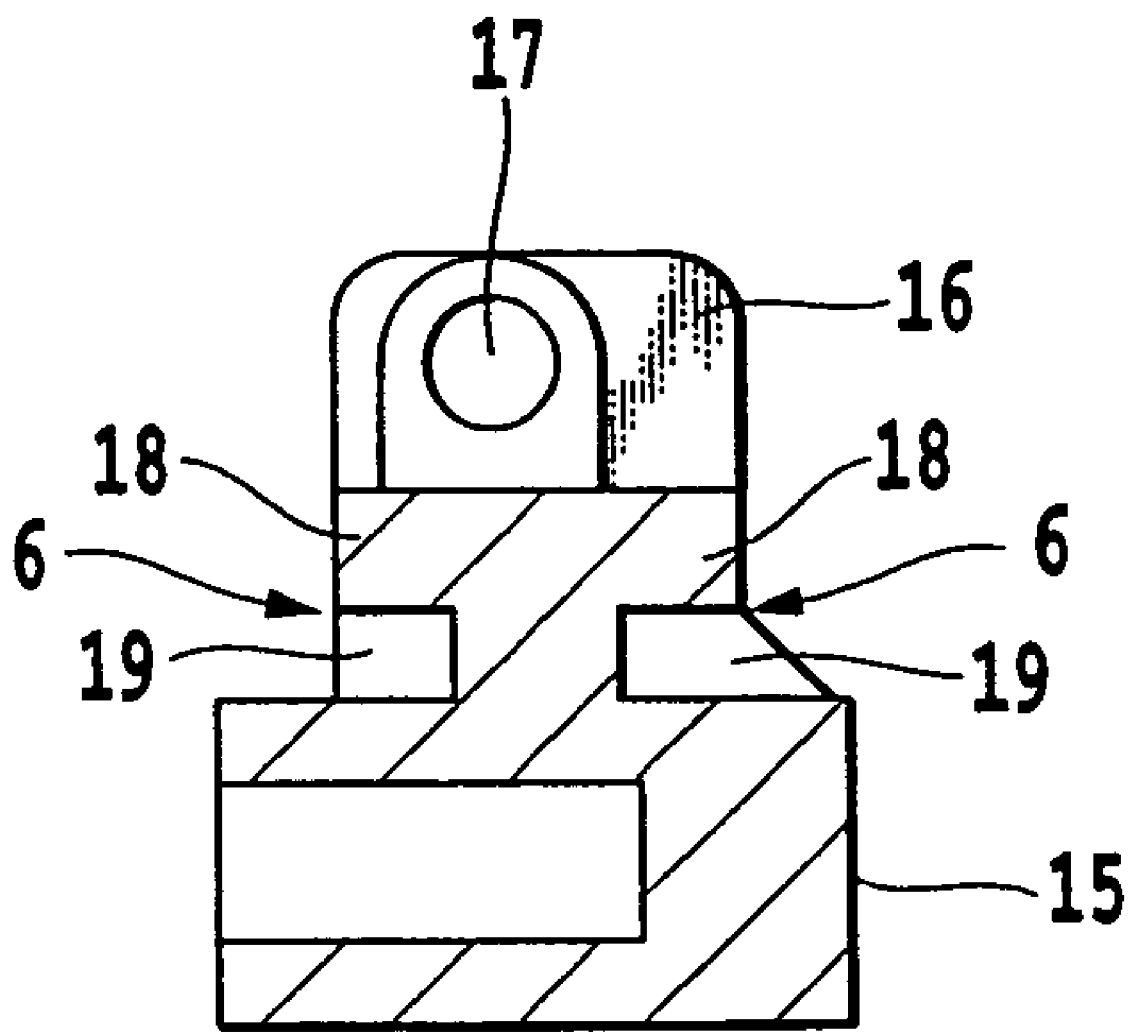
FIG. 13 is a partially sectional view taken along a line XIII-XIII in FIG. 8.
Figure 14:
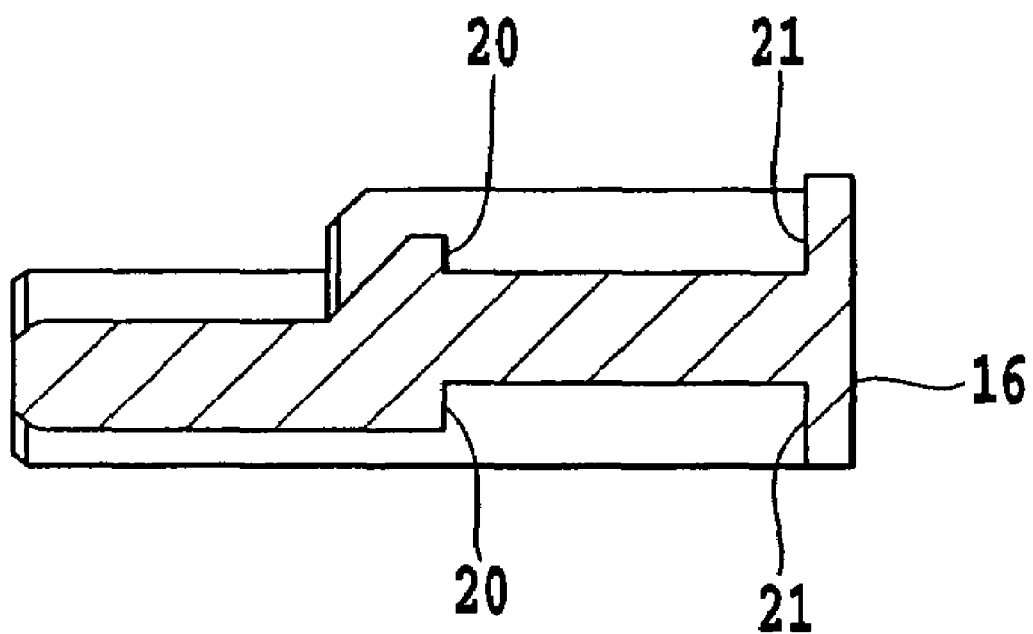
FIG. 14 is a partially sectional view taken along a line XIV-XIV in FIG. 8.
Figure 15:
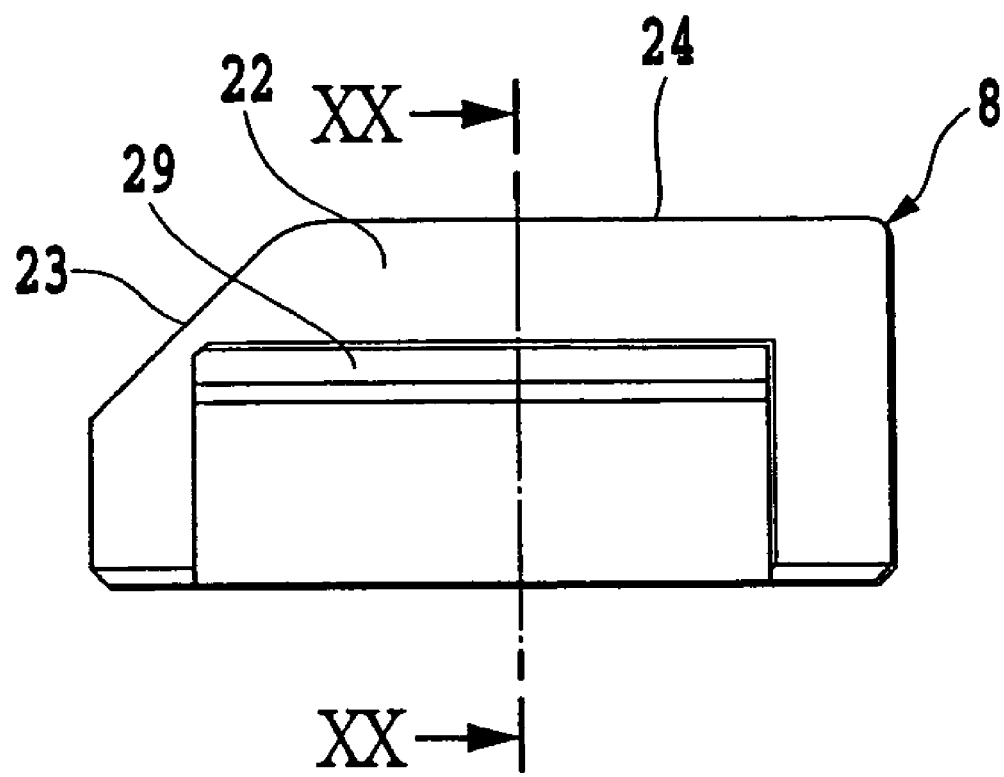
FIG. 15 is a front view of the card-stopper cap in the inventive card connector.
Figure 16:
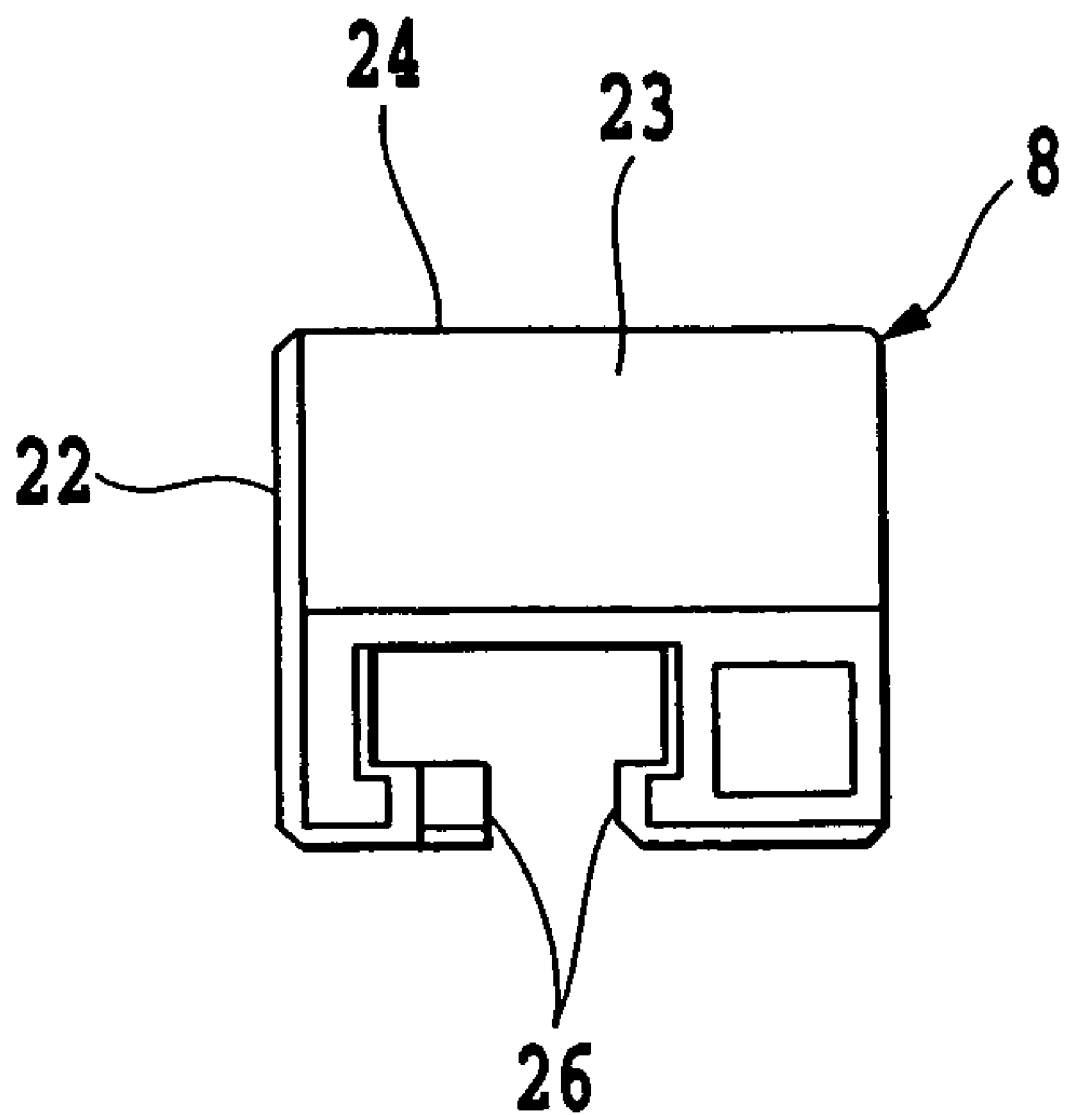
FIG. 16 is a left side view of the card-stopper cap shown in FIG. 15.
Figure 17:
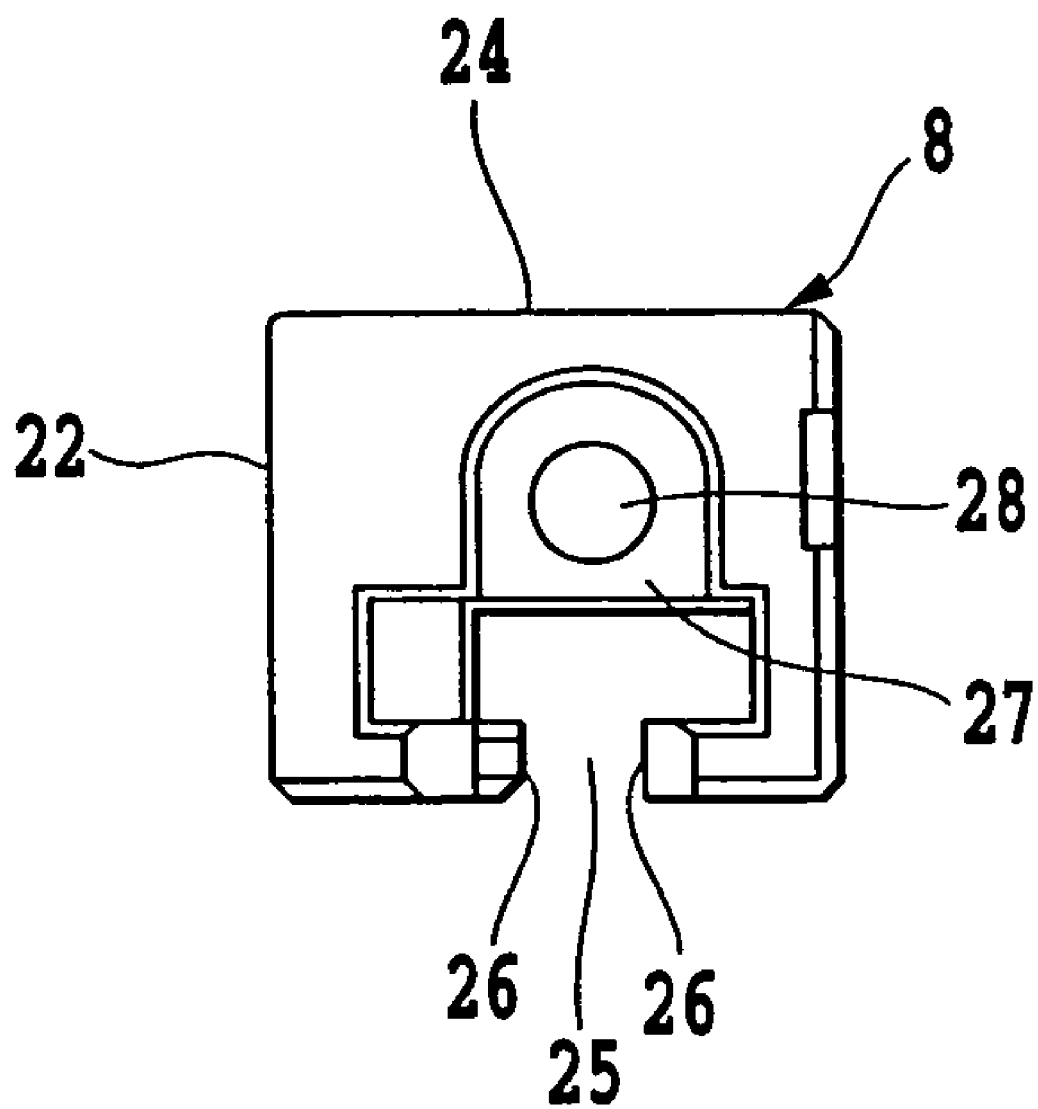
FIG. 17 is a right side view of the card-stopper cap shown in FIG. 15.
Figure 18:
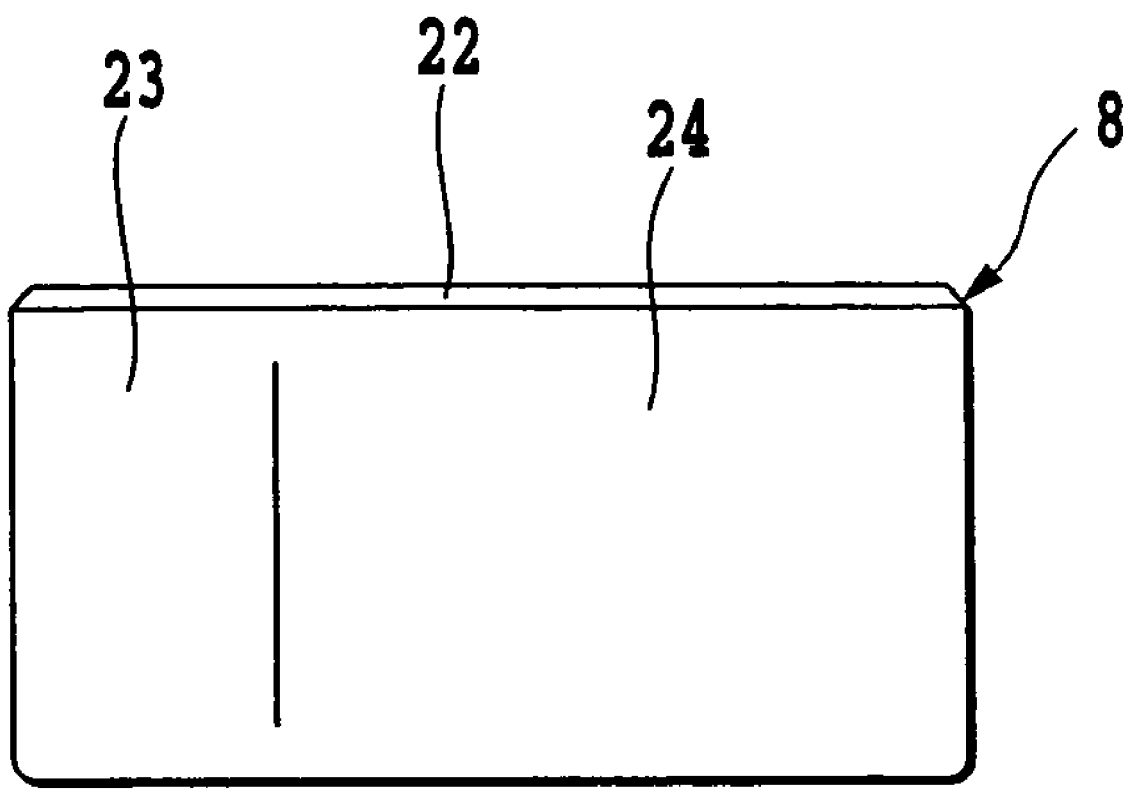
FIG. 18 is a front view of the card-stopper cap shown in FIG. 15.
Figure 19:
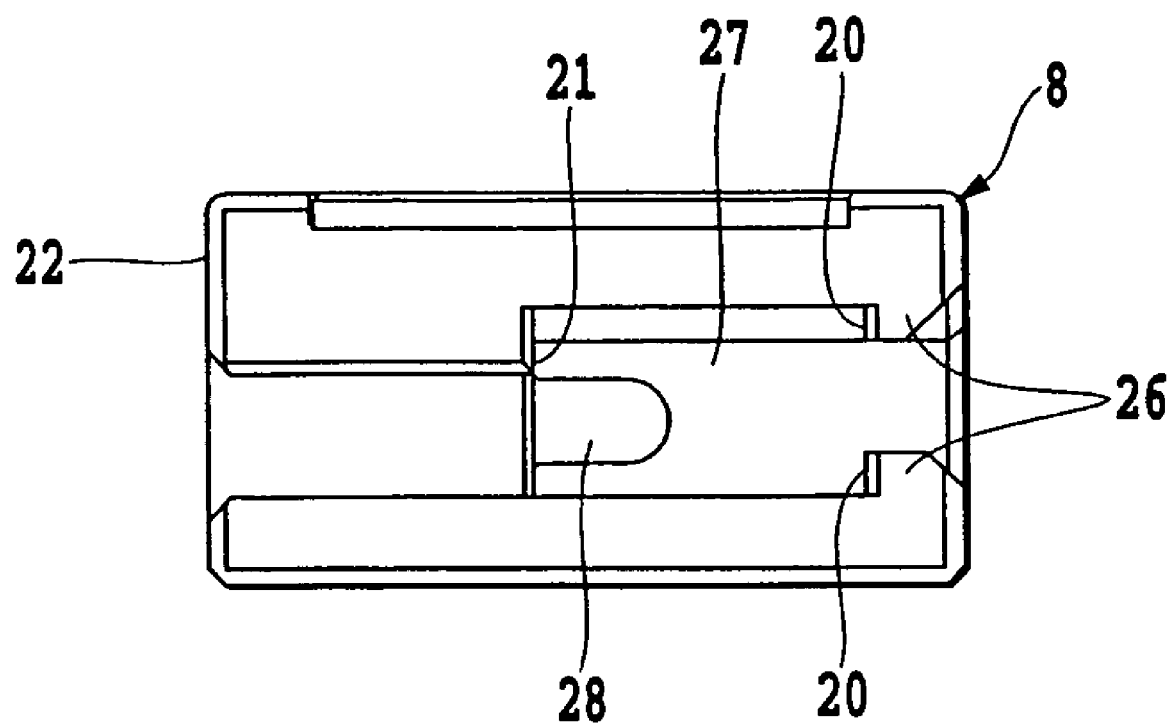
FIG. 19 is a rear view of the card-stopper cap shown in FIG. 15.
Figure 20:
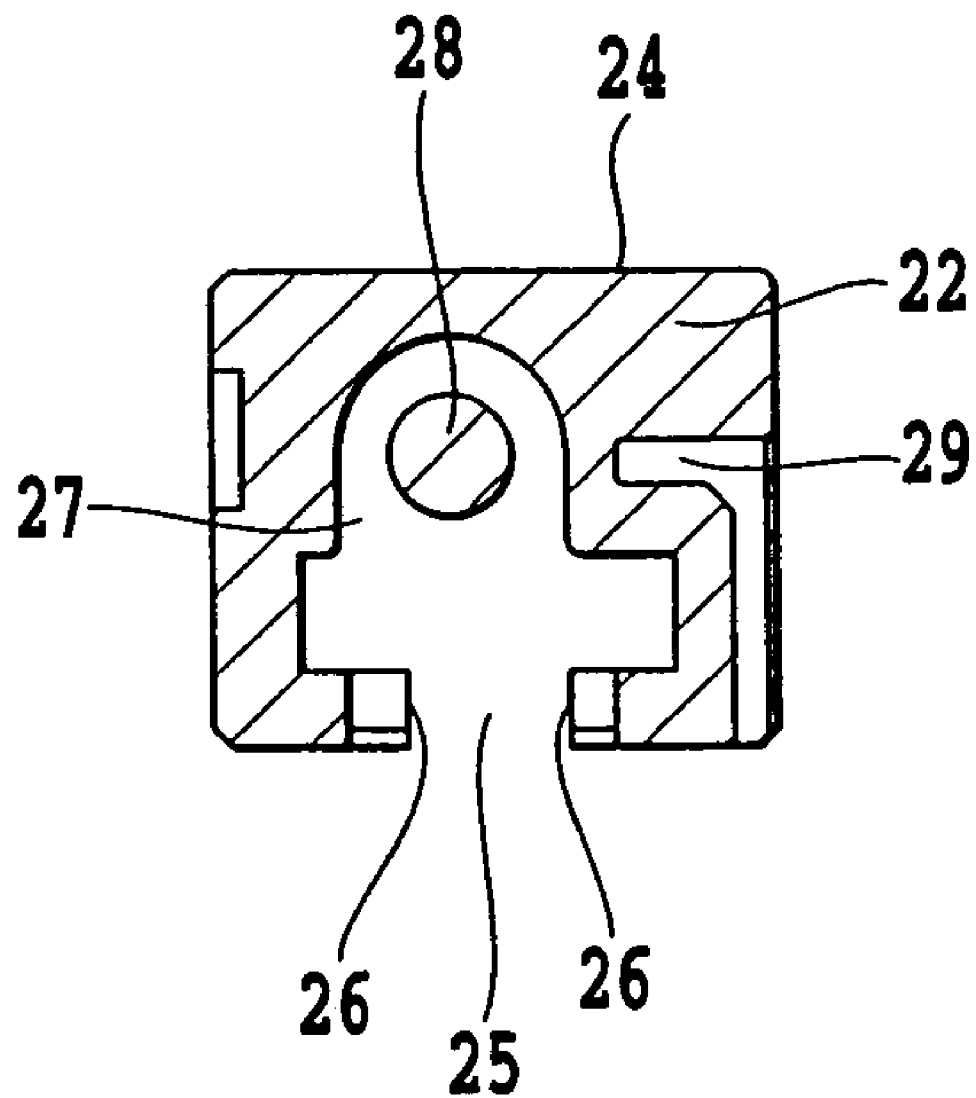
FIG. 20 is a sectional view taken along a line XX-XX in FIG. 15.
Figure 29:
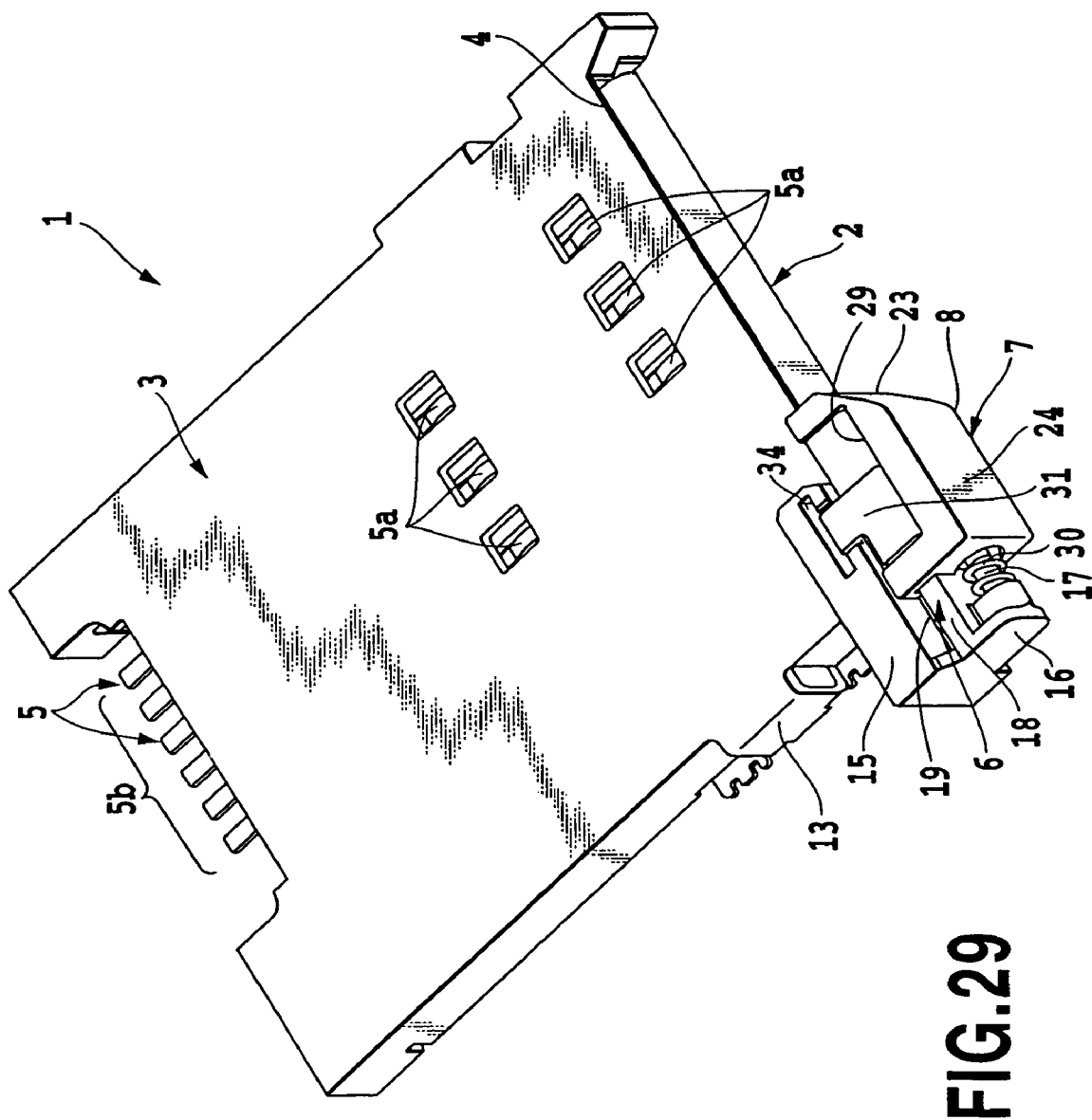
FIG. 29 is a perspective view of a modification of the card connector in the first embodiment in which a cover member is integral with a soldered terminal.
Figure 30:
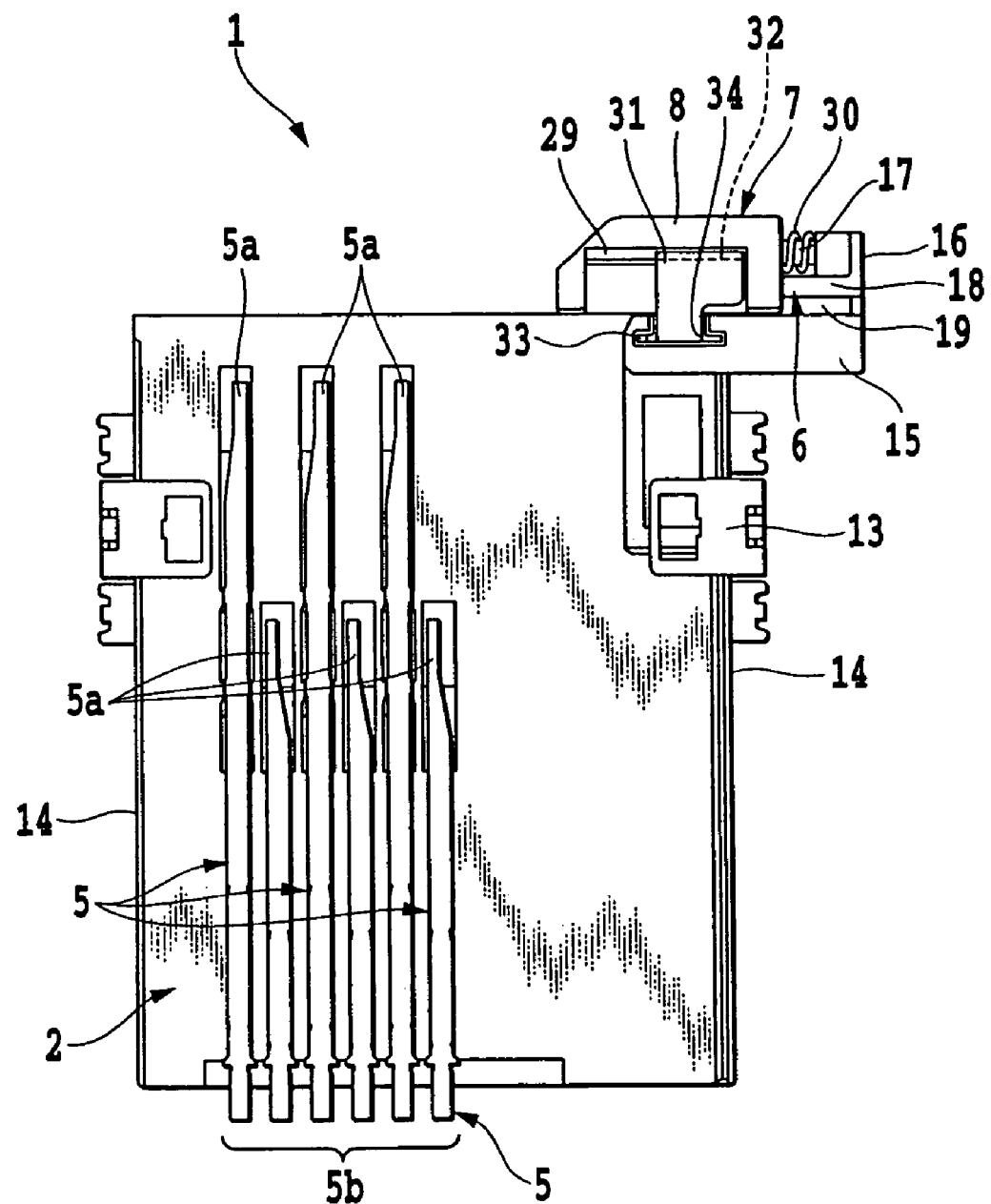
FIG. 30 is a front view of another modification of the card connector in the first embodiment in which no ejector mechanism is provided, the cover member being removed therefrom.

FIGS. 1 to 7 illustrate a first embodiment of a card connector according to the present invention, wherein FIG. 1 is a perspective view of a first embodiment according to the present invention, illustrating a state in which a card is not yet inserted and a card-stopper cap is locked; FIG. 2 is a perspective view of the inventive card connector shown in FIG. 1 in which the card is ejected and the card-stopper cap is open; FIG. 3 is a perspective view of the inventive card connector shown in FIG. 2 in which the card is locked and the card-stopper cap is locked; FIG. 4 is a front view of the inventive card connector shown in FIG. 1 in which the card is not yet inserted and the card-stopper cap is locked; FIG. 5 is a front view of the inventive card connector similar to FIG. 4 in which a cover member is removed; FIG. 6 is a front view of the inventive card connector shown in FIG. 5 in which the card is inserted to the deepest position in the card connector; and FIG. 7 is a front view of the inventive card connector shown in FIG. 6 in which the card is locked at an ejector-locked position. Also, FIGS. 8 to 12 are a front view, a left side view, a right side view, a front view and a rear view of a connector body, respectively, removing a cover member from the inventive card connector. FIG. 13 is a partially sectional view taken along a line XIII-XIII in FIG. 8, and FIG. 14 is a partially sectional view taken along a line XIV-XIV in FIG. 8. Further, FIGS. 15 to 19 are a front view, a left side view, a right side view, a front view and a rear view of a card-stopper cap in the inventive card connector, respectively, and FIG. 20 is a sectional view taken along a line XX-XX in FIG. 15. Also, FIG. 29 is a perspective view of a modification of the card connector in the first embodiment in which a cover member is integral with a soldered terminal, and FIG. 30 is a front view of another modification of the card connector in the first embodiment in which no ejector mechanism is provided, the cover member being removed therefrom.

First, as shown in FIGS. 1 to 7, a card connector 1 in the first embodiment of the present invention is formed of a connector body 2 and a cover member 3 combined with the connector body 2 to be a flat housing.

One side of the connector body 2; i.e., the foremost end thereof is opened to define a card-inserting opening 4. On one side of the inventive card connector 1 closer to the card-inserting opening 4, a card-ejection preventing mechanism 7 is provided. The card-ejection preventing mechanism 7 includes a card-stopper cap 8 slidable along the card-inserting opening 4 of the card body 2.

The other side of the inventive card connector 1; i.e., the rearmost end thereof is closed and a plurality of contacts 5 are provided for the electric connection with an inserted card C such as an IC card, an SD card or a SIM card.

An outer terminal section 5b of the respective contact 5 extends outside as an external terminal to be soldered and connected to a printed wiring or a printed circuit of an electronic instrument or an information terminal equipment to which the inventive card connector 1 is mounted.

A soldered terminal 13 is provided at least one lateral end of the cover member 3 as shown in FIGS. 1 to 7 so that the soldered terminal 13 is soldered to the printed wiring or the printed circuit to fix the cover member 3 therewith.

The card C such as an IC card, an SD card or a SIM card used in the inventive card connector is provided with a plurality of pad sections arranged at an inserting end thereof in the same manner as in the conventional card, and one corner thereof is obliquely cut off to define a chamferred portion. By this chamferred portion, the card C is smoothly guided while sliding along opposite side walls 14 of the card connector 1.

Suitable means is provided in the inventive card connector 1 for preventing the card such as an IC card, an SD card or a SIM card from being inserted with a rear end thereof at the head or in the reversed state when the card C is inserted from the card-inserting opening 4 and for suppressing the floating-up of the inserted card.

Also, an ejector mechanism 10 is provided for smoothly removing the card C inserted into the card connector 1 therefrom.

For the purpose of suppressing the floating-up of the card C, the elastic force of the contact 5 applied onto the pad section of the card C is favorably used.

First, as illustrated, the connector body 2 in the inventive card connector 1 is molded of suitable electric insulation material such as synthetic resin to be a hollow flat housing by being combined with the cover member 3. This hollow flat housing shape is adapted to receive the card C such as an IC card, an SD card or a SIM card therein. On one side of the connector body 2 formed of the electric insulation material, the ejector mechanism 10 (see FIGS. 5 to 7) is provided to smoothly withdraw the card C from the card connector 1.

For instance, the ejector mechanism 10 is formed of a generally L-shaped ejector member 11 adapted to be smoothly slidable along one of the side walls 14 of the connector body 2, and an elastic member 12 such as a coil spring for biasing the ejector member 11. Accordingly, the ejector mechanism 10 is adapted to press the ejector member 11 by the elastic force stored in the elastic member 12 to push out the card C. In this regard, the structure of the ejector mechanism 10 should not be limited to that described above, but may be of any other structure similar thereto, of course.

The cover member 3 of the inventive card connector 1 is made of an electro-insulation material such as suitable synthetic resin to have the illustrated shape. This cover member 3 may be a metallic cover formed of a blanked or pressed metallic sheet such as a stainless steel sheet instead of the synthetic resinous material, for the purpose of reducing a height of the card connector while maintaining a sufficient mechanical strength.

In addition, the card-inserting opening 4 is formed at a front end of the cover member 3, left and right sides of which are bent to cover the side walls 14, 14 so that the outer periphery of the side walls 14, 14 hugs the connector body 2 to be integral therewith. The soldered terminal 13 is provided at the end of the cover member 3 to be soldered to the printed wiring or the printed circuit.

In this case, since the soldered terminal 13 can be formed integral with the cover member if the latter is made of metal as shown in FIG. 29, it is possible to reduce the number of parts.

Since the soldered terminal 13 is connected as a ground terminal to the printed wiring or the printed circuit to earth the static electricity through the same, a risk of the storage of static electricity is eliminated.

An opening is provided at the rear end of the cover member 3 for allowing the plurality of contacts 5 to be projected outside therefrom to form terminal sections 5b bent inward and used as external terminals, as shown in FIGS. 4 and 5.

Thus, the card C such as an IC card, an SD card or a SIM card is inserted into the card connector 1 from the card-inserting opening 4 formed at a front end of the cover member 3, and removed out therefrom by the elastic force of the elastic member 12 via the ejector member 11 of the ejector mechanism 10.

Further, the plurality of contacts 5 are provided at the rear end of the card connector 1.

Contact 5 are brought into contact with the pad section of the card C such as an IC card, an SD card or a SIM card inserted into the card connector 1 to be electrically connected thereto.

Through these contacts 5, the card C is electrically connected to contacts (not shown) in the printed circuits of the electronic instrument.

That is, the contact 5 has, at tip end thereof, an elastic contact piece 5a curved in an arcuate manner to be brought into contact and connected with the pad section of the card C such as an IC card, an SD card or a SIM card.

Also, the contact 5 has, at a rear end thereof, the terminal section 5b suitably soldered and connected to the contact of the printed circuit in the electronic instrument or the information terminal equipment.

In the inventive card connector 1 thus structured, the card C such as an IC card, an SD card or a SIM card may be that in which is incorporated an electronic element such as an IC chip.

When the card C is normally inserted from the card-inserting opening 4 into the card connector, the pad sections of the card C are correctly arranged in correspondence to the contacts 5 so that the elastic contact pieces 5a of the contacts 5 are positioned above the pad sections of the card C and connected thereto in a favorable manner.

In this case, when the tip end of the card C is inserted, the elastic contact piece 5a of the contact C is pushed upward and elastically deformed in FIG. 1, and then brought into contact with the pad section of the card C with a suitable elastic pressure to result in the favorable connection.

Thereby, the card C is electrically connected from the pad section to the contact of the printed circuit in the electronic instrument via the contact C.

If the card C is reversely (rearwardly) inserted by error, the rear end of the card C abuts to the card-stopper cap 8 to inhibit the insert of the card C.

Thus, the card-stopper cap 8 effectively operates as a stopper to inhibit the erroneous insert of the card C.

As illustrated, the card-ejection preventing mechanism 7 for preventing the ejection of the card C from ejecting from the inventive card connector 1 has the slidable card-stopper cap 8 at one end of the connector body 2 on the side on which is provided the card-inserting opening 4. The card-stopper cap 8 is provided on a support base 15 disposed on the connector body 2 at one end thereof to be slidable by a slide mechanism 6 in the lateral direction at a required distance and elastically biased by an elastic member 30.

Thus, the card-stopper cap 8 is normally biased by the elastic member 30 to occupy a locked position, and when the card C is inserted, the card-stopper cap 8 is pushed outward against the elastic force of the elastic member 30 by the card C to occupy an open position.

A structure of the support base 15 to which the card-stopper cap 8 is mounted is illustrated in FIGS. 8 to 14, and a structure of the card-stopper cap 8 is illustrated in detail in FIGS. 15 to 20.

First, as shown in FIGS. 8 to 14, the support base 15 for attaching the card-stopper cap 8 is of a generally flat plate shape placed on the connector body 2 and projected outward from one end thereof. The support base 15 has a support wall 16 standing up at an outer end thereof, whereby a generally L-shape is formed.

The support wall 16 operates as a stopper section of the card-stopper cap 8, and has a pin 17 extending inward. One end of the elastic member 30 is attached to the pin 17, and the other end of the elastic member 30 is fit into a hole 27 of the card-stopper cap 8 shown in FIG. 17.

The elastic member 30 elastically biases the card-stopper cap 8 toward the locked position so that the elastic member 30 is pressed and compressed during the insert or withdrawal of the card.

Also, the support base 15 has guide rails 18 as guiding means and grooves 19 for forming the guide rails 18. In the grooves 19 of the guide rails 18, detents 26 of the card-stopper cap 8 shown in FIG. 8 are inserted to guide the card-stopper cap 8 in the lateral direction while preventing the card-stopper cap 8 from coming off.

Further, there are a locked position stopper 20 and an open position stopper 21 for limiting the sliding distance of the card-stopper cap 8. The slide mechanism 6 is structured by these guide rails 18 and the grooves 19.

The card-stopper cap 8 is mounted to the support base 15 of the connector body 2 to be slidable in the lateral direction by a limited distance between the locked position and the open position.

The structure of the card-stopper cap 8 is illustrated in FIGS. 15 to 20.

As illustrated, the card-stopper cap 8 is formed of a generally rectangular lid body 22. A card-introduction surface is provided by cutting off the upper edge of the lid body 22 to form a slanted guide surface 23, while remaining a flat upper surface 24.

On the bottom of the card-stopper cap 8, an elongate groove 25 is provided. Also, a pair of locking detents 26 projected inward to be opposite to each other are provided at an outer end and engaged with the grooves 19 of the guide rails 18 in the support base 15.

The locking detent 26 is slidable in the lateral direction along the guide rail 18, which sliding motion is limited by the contact thereof with the stopper 20 or 21.

The hole 27 opening rightward is provided in a middle portion of the card-stopper cap 8. A pin 28 projects from the inside wall of the hole 27. One end of the elastic member 30 is engaged with the pin 28 and secured there.

Usually, the elastic member 30 elastically biases the card-stopper cap 8 inward to the inner locked position. However, since the elastic member 30 is compressed when the card is inserted, the card-stopper cap 8 is pushed outward to the open position.

On one side of the card-stopper cap 8, a groove 29 extends in the lateral direction. The groove 29 is used for holding the card-stopper cap 8 during the slide motion of the card-stopper cap 8 between the locked position and the open position. For example, it guides a leg 32 of a holder 31 made from metallic material.

The holder 31 is provided in the support base 15 for firmly attaching the card-stopper cap 8 thereto so that it does not come off during the lateral slide motion thereof between the locked position and the open position. The holder 31 has a cross-section of a generally C-shape. An upper leg 32 thereof is fitted into the groove 29 in the card-stopper cap 8 and a lower leg 33 is inserted into a hole 34 of the support base 15 and fixed thereto.

Thus, the holder 31 is formed so that the groove 29 of the card-stopper cap 8 slides relative to the upper leg 32 during the slide motion of the card-stopper cap 8.

The operation of the inventive card connector 1 having the card-ejection preventing mechanism 7 of the above structure during the use will be described below.

First, when the card C is normally inserted into the card connector 1 from the card-inserting opening 4 in a condition shown in FIG. 1 wherein the card is not yet mounted and the card-stopper cap 8 is at the locked position, the cut portion of the card C is brought into contact with the slanted guide surface 23 of the card-stopper cap 8 which is the card-introduction surface and pushes the card-stopper cap 8 outward by the slide mechanism 6.

By this series of operations, the card-stopper cap 8 presses the elastic member 30 and slides on the support base 15 to result in a state shown in FIG. 2 wherein the card c is inserted into the card connector 1.

When the card C is further firmly inserted from the state shown in FIG. 2 to be in a deepest state shown in FIG. 6, the card-stopper cap 8 is pushed inward by the elastic member 30 to slide along the groove 19 of the guide rail 18 by the slide mechanism 6 of the support base 15, and abuts to the upper end of the card C to result in the card-locked state shown in FIG. 7.

In this card-locked state, the card C is prevented by the card-stopper cap 8 from being carelessly ejected from the card connector. Also, in this case, the elastic member 12 is in a compressed state in the ejector mechanism 10 as shown in FIG. 7.

With reference to FIG. 7, at the ejector-locked position, the card C is firmly locked by the card-stopper cap 8 to be in a card-locked state, and the ejector mechanism 10 is also locked to be in an ejector-locked state.

Accordingly, in the card-locked state, even if the card connector 1 is carelessly dropped down, the ejection of the card C due to the shock or the vibration is inhibited by the card-ejection preventing mechanism 7 so that the card C is suitably protected.

Thus, since the ejection of the card C is inhibited unless the card-stopper cap 8 is intentionally moved to the open position, it is possible to always bring the elastic contact piece 5a of the contact 5 into contact with the pad section of the of the card C without coming off from the latter.

As a result, in the card-locked state, it is possible to maintain a favorable contact of the pad section of the card C with the contact 5 of the card connector 1 to inhibit the generation of read error as well as suitably prevent the ejection of the card C.

As described above, since the inventive card connector 1 is in the card-locked state shown in FIG. 7, the card C is always biased in the ejecting direction by the internal elastic member 12.

Thus, the card C is ready for ejection, but is prevented therefrom since the card C is locked by the card-stopper cap 8 in the card-locked state.

Accordingly, in the card-locked state, if the card-stopper cap 8 is made to manually slide toward the open position, the card-stopper cap 8 pushes and compresses the elastic member 30 from a state shown in FIG. 3 to that shown in FIG. 2 in which the card-stopper cap 8 is free from the upper end of the card C.

Thereby, the card C is ejected by the elastic force of the elastic member 12 via the ejector member 11 in the ejector mechanism 10.

The inventive card connector 1 thus structured has a flat and hollow housing shape formed of the connector body 2 and the cover member 3 in combination with the connector body 2. Also, the card-ejection preventing mechanism 7 having the card-stopper cap 8 slidable in the lateral direction along the card-inserting opening 4 is provided.

Therefore, it is possible to well preventing the ejection of the card C due to the shock when the card connector 1 is carelessly dropped down.

Thus, according to the card connector 1, it is possible to protect the card C from the damage and to prevent the contact portion from coming off from the card pad to cause the read error, whereby not only the card connector 1 but also the card C itself are well protected.

As shown in FIG. 30, there is a modification in which no ejector mechanism 10 is provided.

In such a case, when the card C is inserted into the deepest position in the card connector 1, the card C is brought into contact with the contact 5 at a suitable elastic contact force and maintained there.

During the withdrawal, the card C is removed from the deepest position by a hand or others.

Second Embodiment

Figure 21:
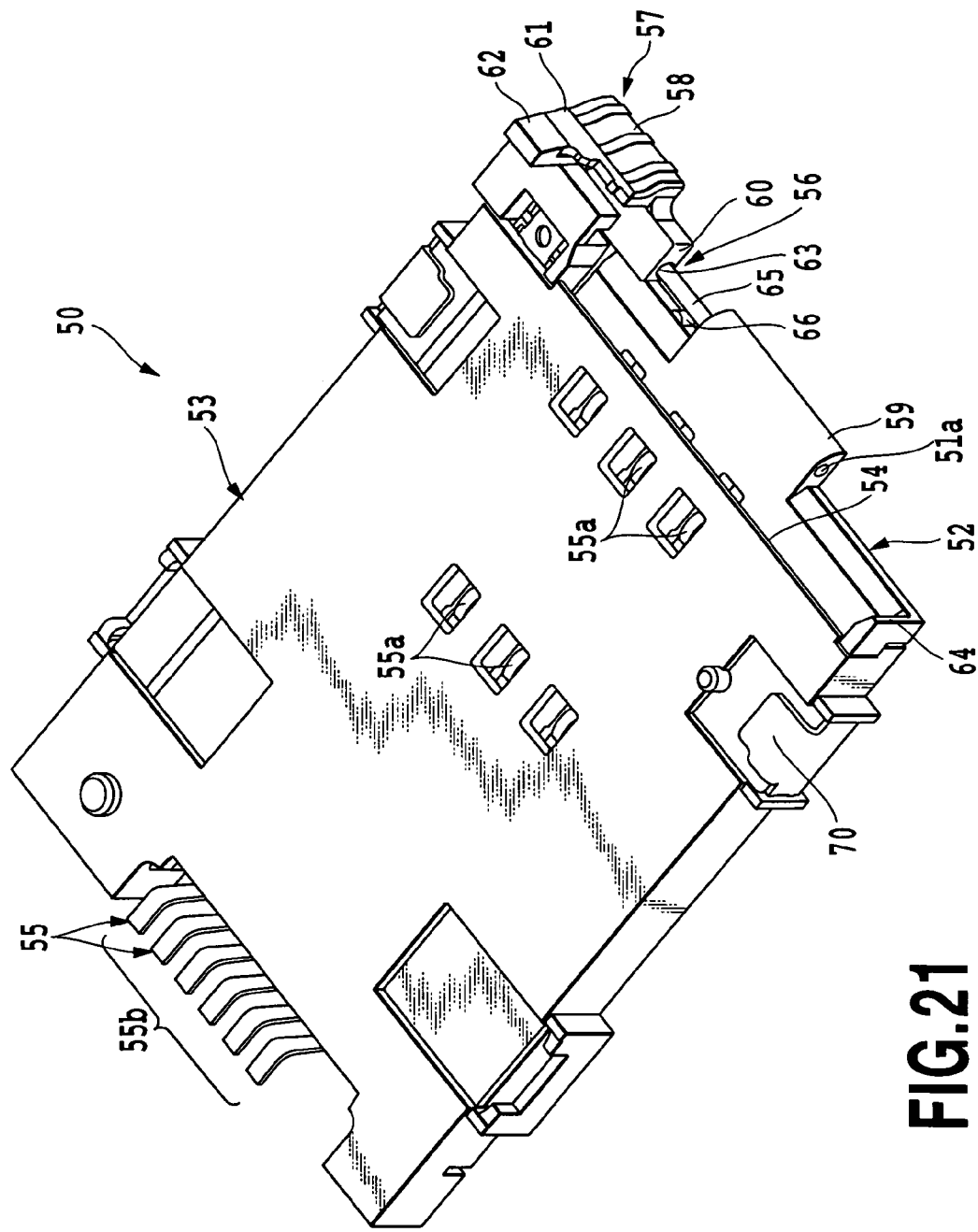
FIG. 21 is a perspective view of a card connector in a second embodiment according to the present invention, illustrating a state in which a card is not yet inserted and a card-stopper cap is open.
Figure 22:
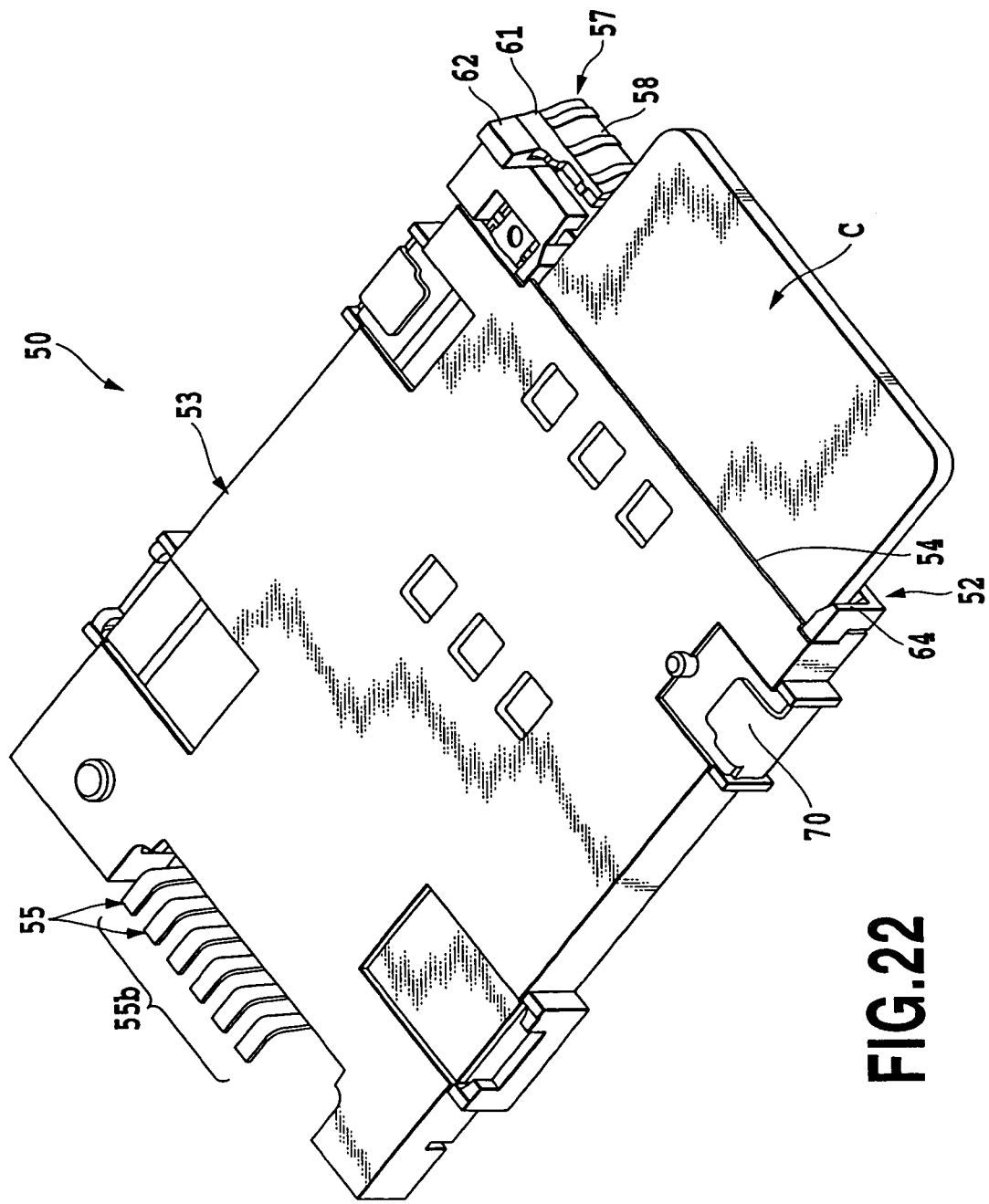
FIG. 22 is a perspective view of the inventive card connector of the second embodiment shown in FIG. 21 in which the card is ejected and the card-stopper cap is open.
Figure 23:
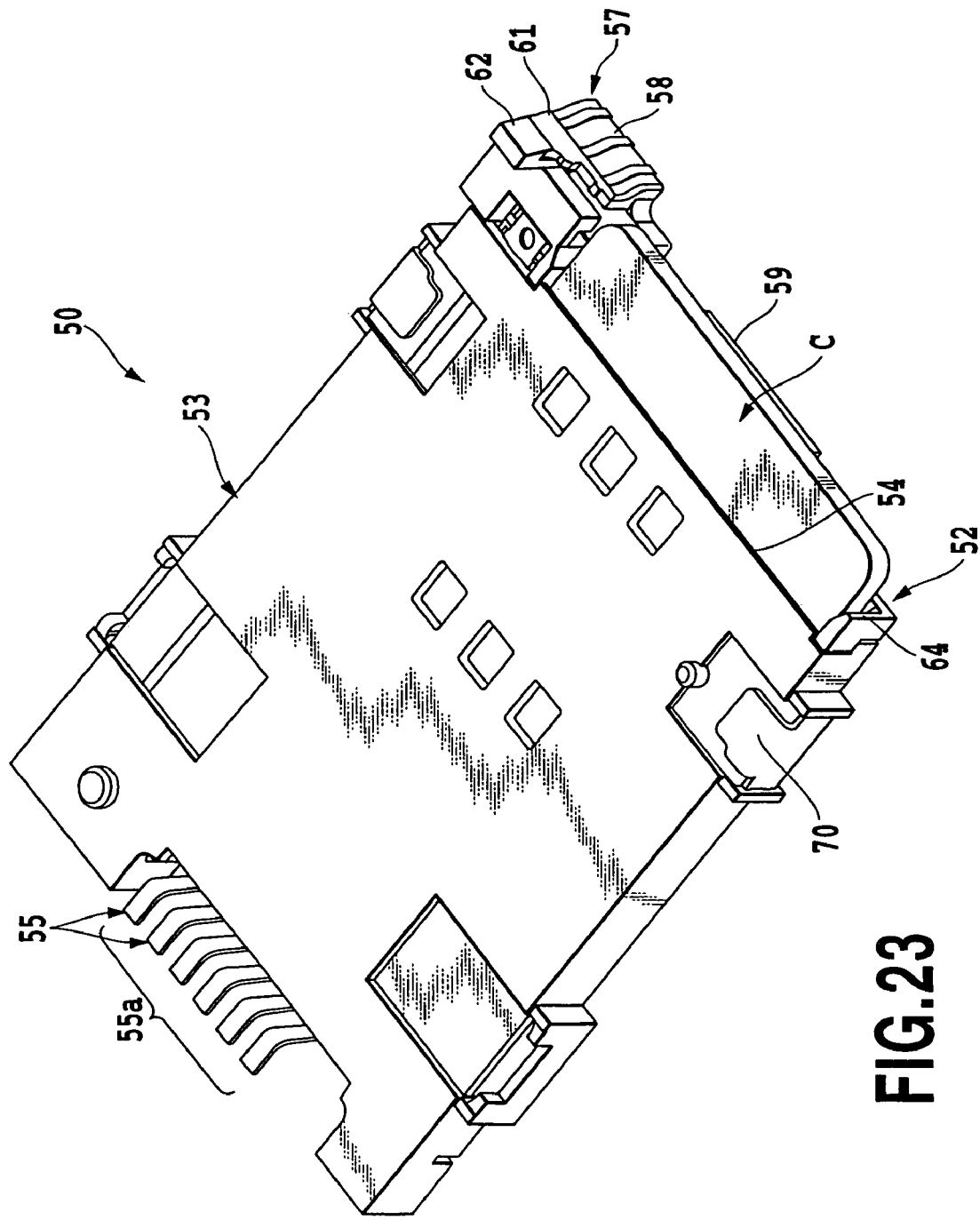
FIG. 23 is a perspective view of the inventive card connector of the second embodiment shown in FIG. 21 in which the card is locked and the card-stopper cap is open.
Figure 24:
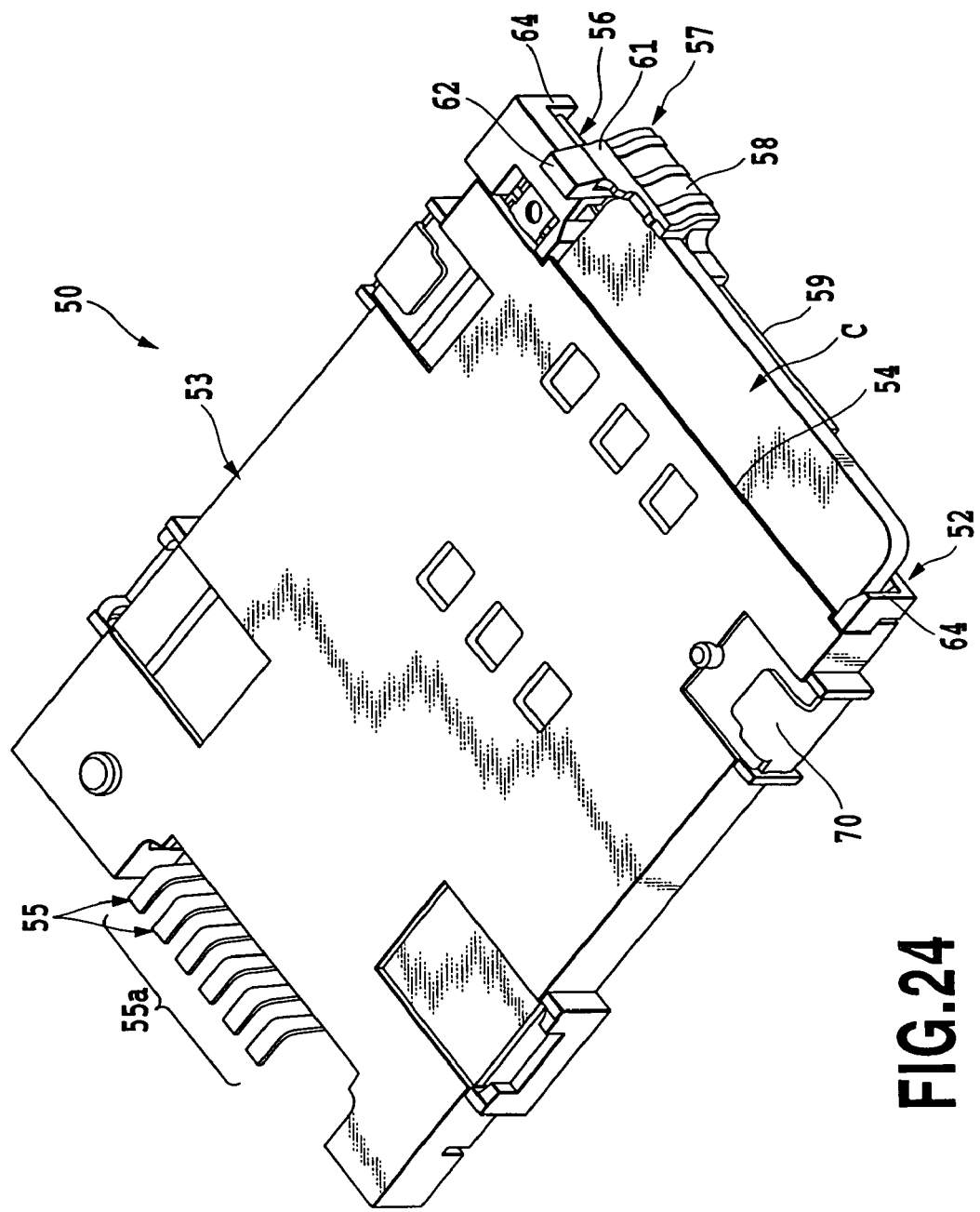
FIG. 24 is a perspective view of the inventive card connector of the second embodiment shown in FIG. 21 in which the card is locked and the card-stopper cap is locked.
Figure 25:
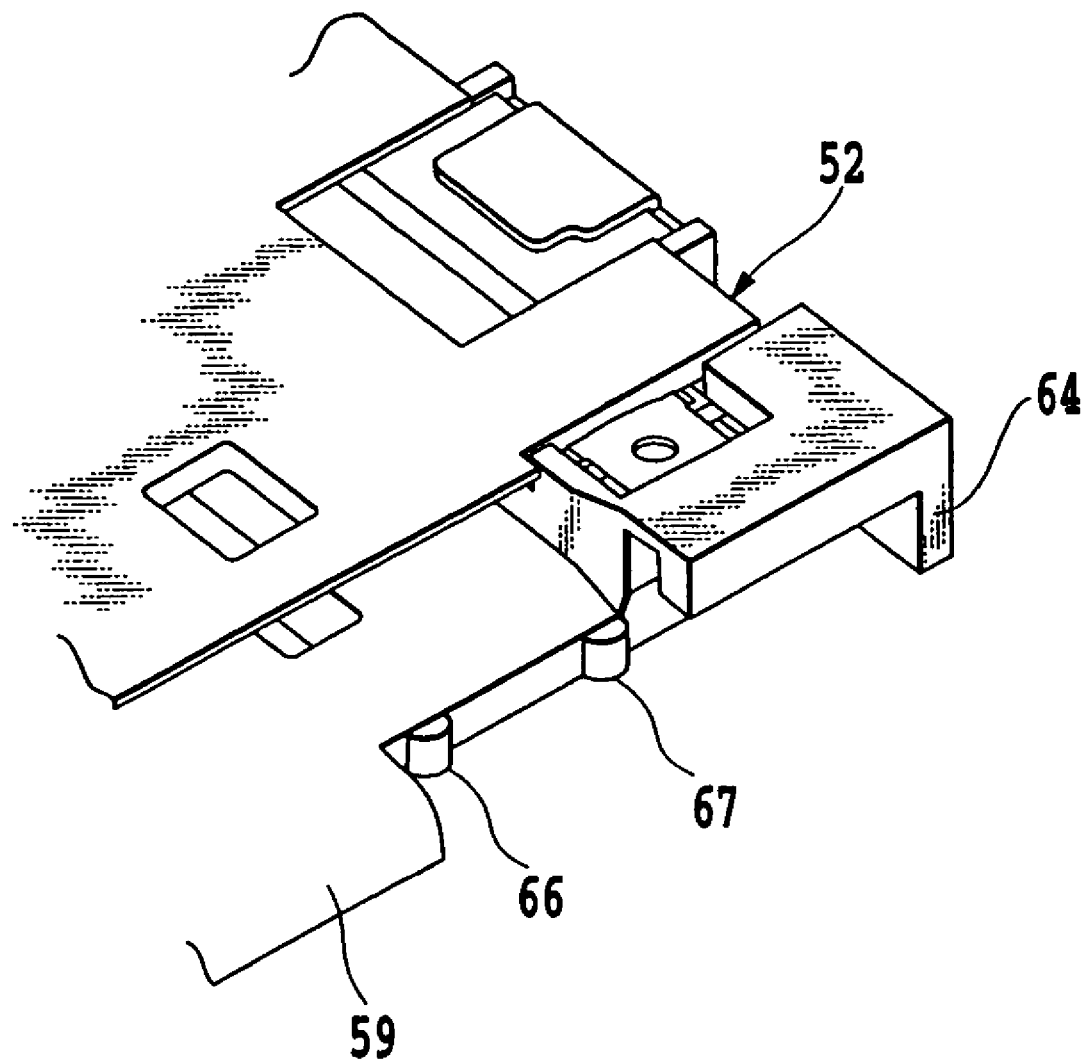
FIG. 25 is a perspective view of a slide mechanism for the card-stopper cap in the second embodiment shown in FIG. 21.
Figure 26:
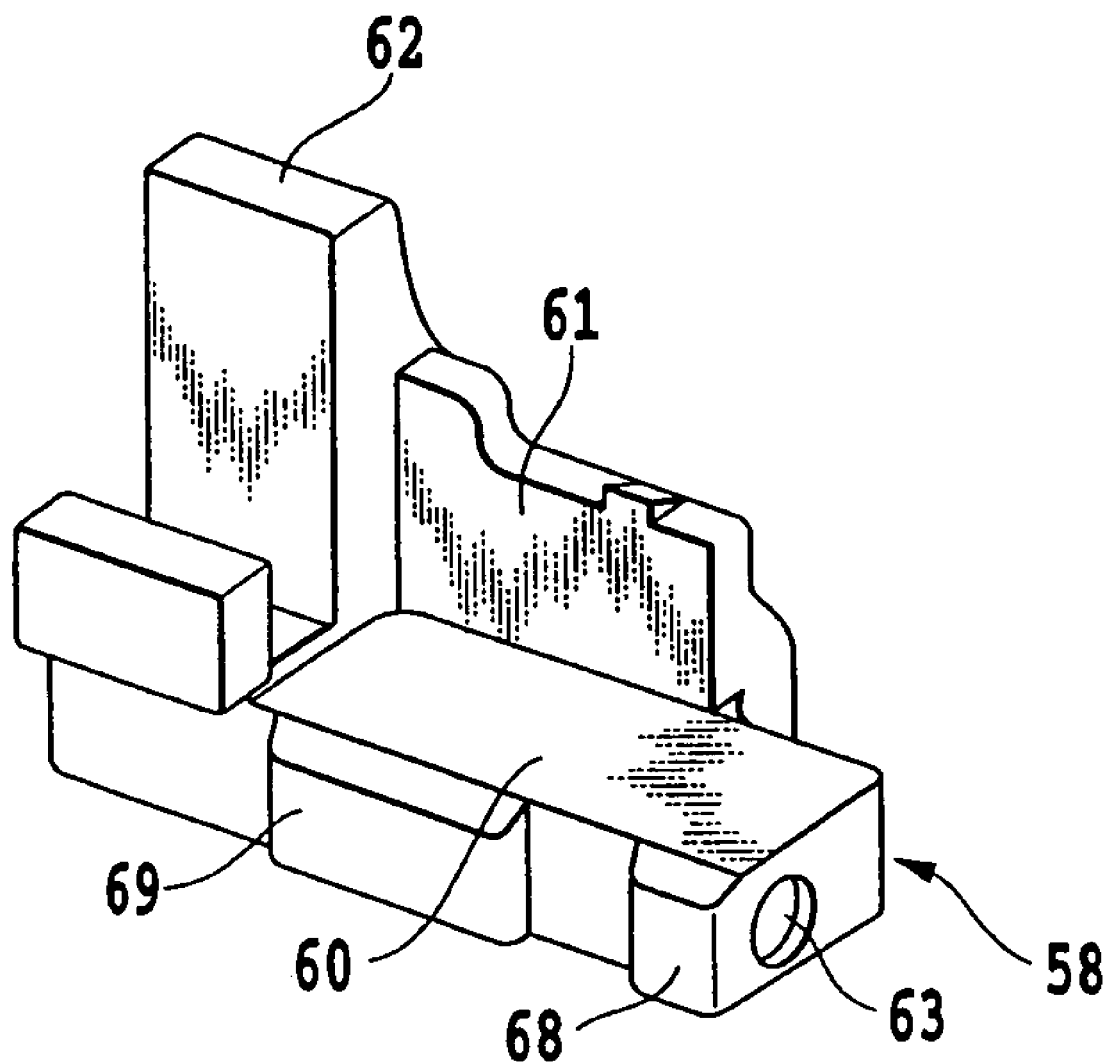
FIG. 26 is a perspective view of the card-stopper cap in the second embodiment as seen from below.
Figure 27:
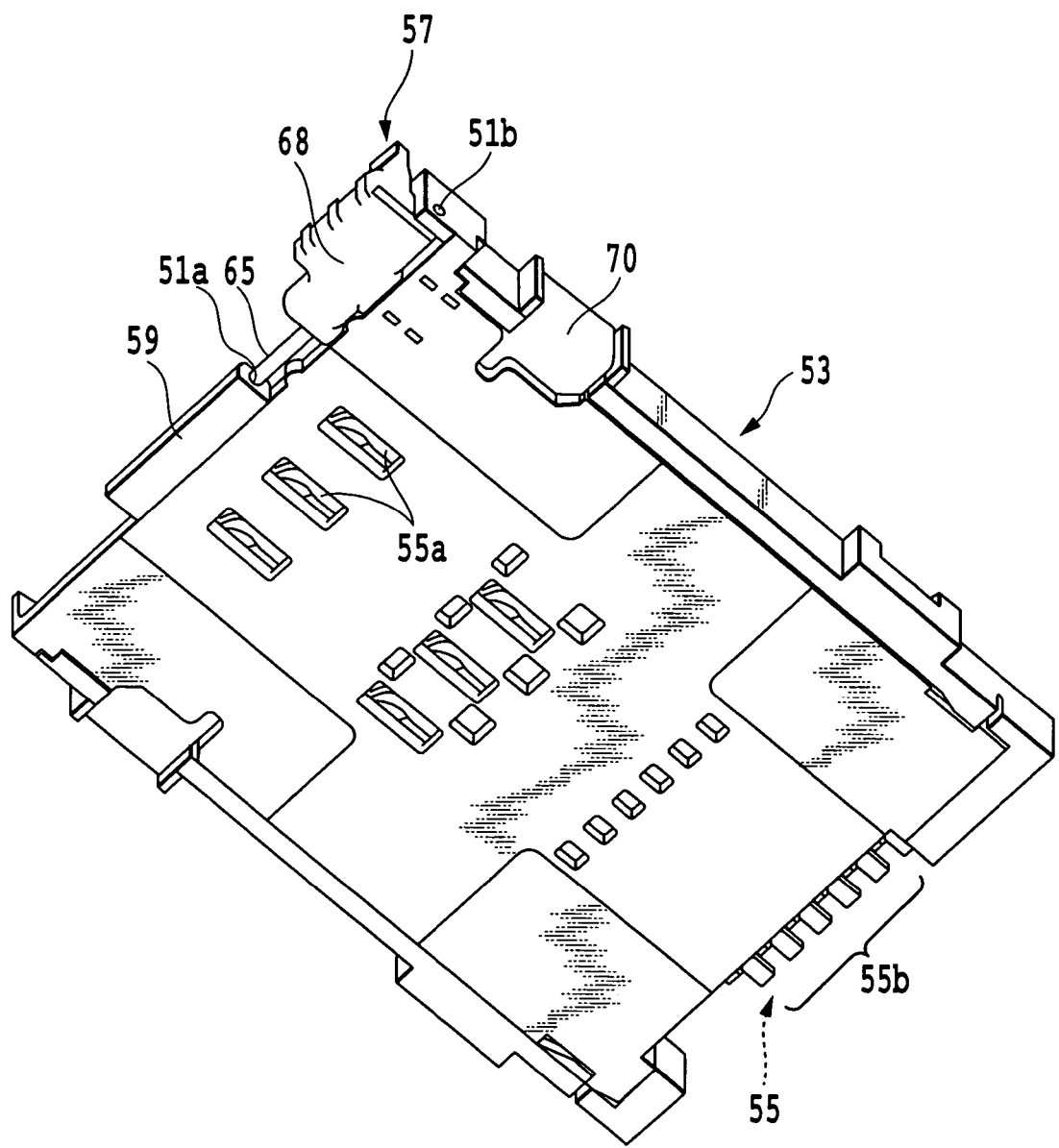
FIG. 27 is a perspective view of inventive card connector of the second embodiment shown in FIG. 21 as seen from the opposite side.
Figure 28:
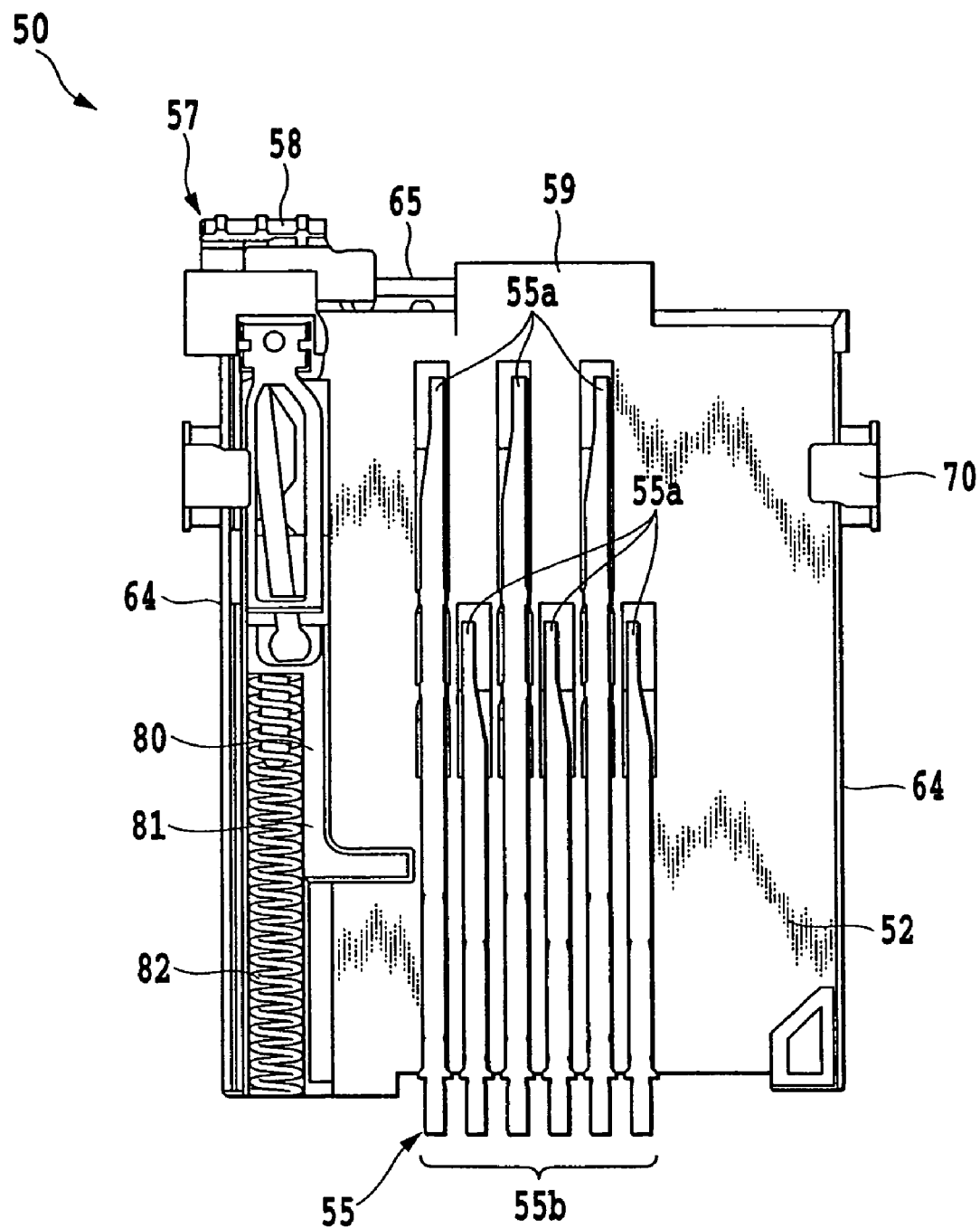
FIG. 28 is a top view of an ejector mechanism and contacts in the connector body from which is removed the cover member.
Figure 31:
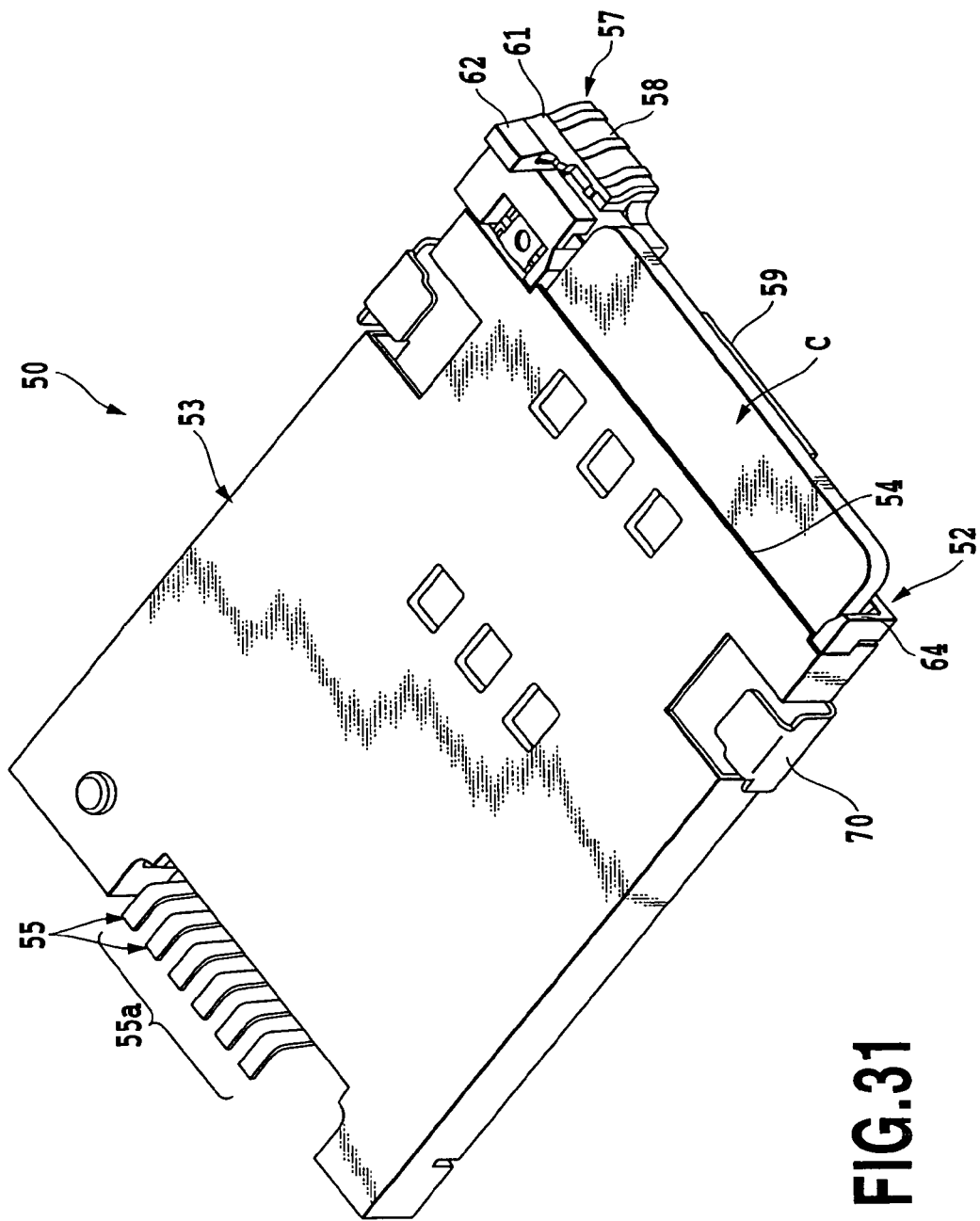
FIG. 31 is a perspective view of a modification of the card connector in the second embodiment in which the cover member is integral with the soldered terminal.
Figure 32:
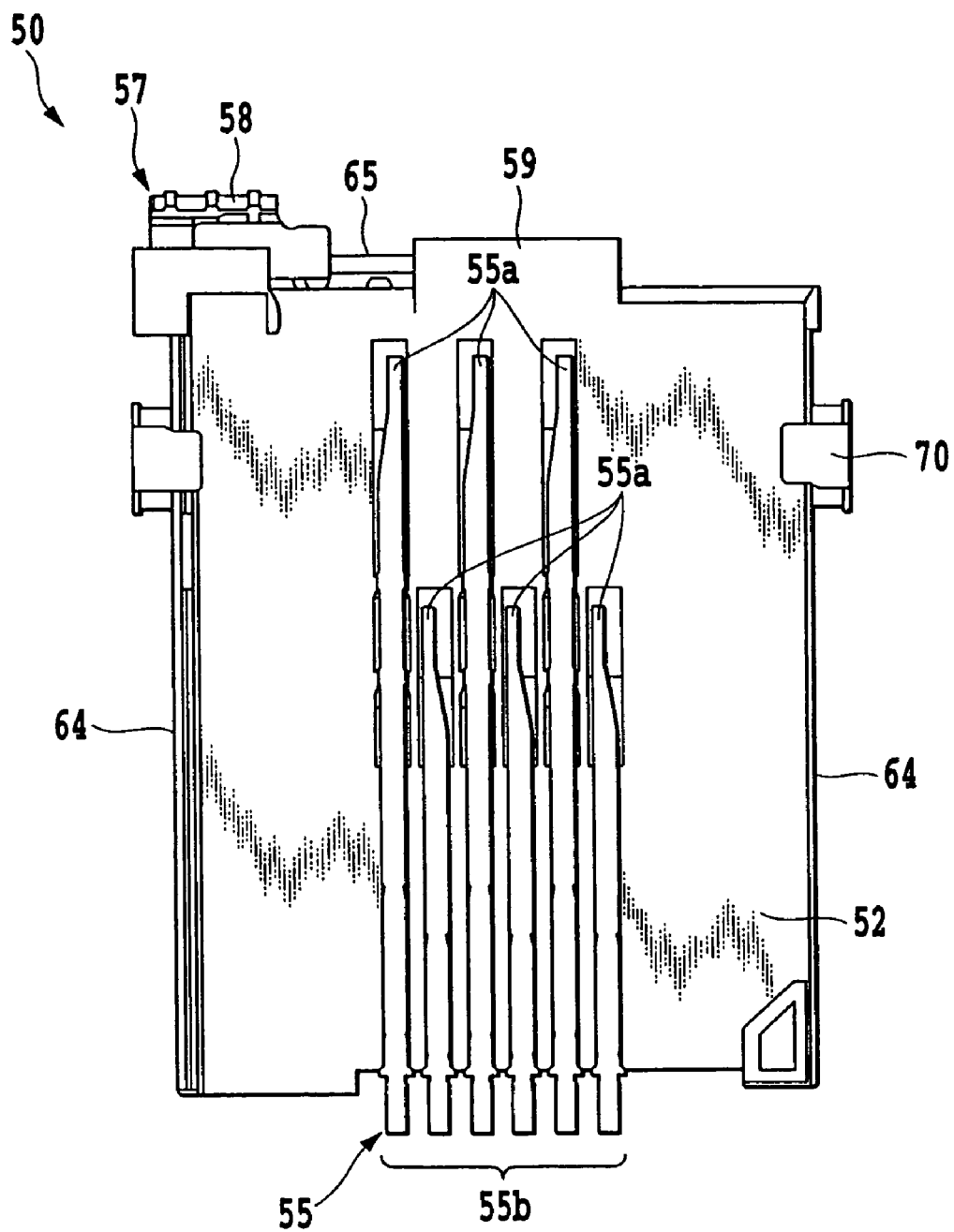
FIG. 32 is a front view of another modification of the card connector in the second embodiment in which no ejector mechanism is provided, the cover member being removed therefrom.

A second embodiment of the inventive card connector is illustrated in FIGS. 21 to 28, wherein FIG. 21 is a perspective view of a card connector of a second embodiment according to the present invention, illustrating a state in which a card is not yet inserted and a card-stopper cap is open; FIG. 22 is a perspective view of the inventive card connector of the second embodiment shown in FIG. 21 in which the card is ejected and the card-stopper cap is open; FIG. 23 is a perspective view of the inventive card connector of the second embodiment shown in FIG. 21 in which the card is locked and the card-stopper cap is open; FIG. 24 is a perspective view of the inventive card connector of the second embodiment shown in FIG. 21 in which the card is locked and the card-stopper cap is locked; FIG. 25 is a perspective view of a slide mechanism for the card-stopper cap in the second embodiment shown in FIG. 21; FIG. 26 is a perspective view of the card-stopper cap in the second embodiment as seen from below; FIG. 27 is a perspective view of inventive card connector of the second embodiment shown in FIG. 21 as seen from the opposite side; and FIG. 28 is a front view of the inventive card connector of the second embodiment shown in FIG. 21, from which is removed the cover member for illustrating the ejector mechanism. Further, FIG. 31 is a perspective view of a modification of the card connector in the second embodiment in which the cover member is integral with the soldered terminal, and FIG. 32 is a front view of another modification of the card connector in the second embodiment in which no ejector mechanism is provided, the cover member being removed therefrom.

As shown in FIGS. 21 to 28, the basic structure of a card connector 50 according to the second embodiment of the present invention is formed of a connector body 52 and a cover member 53 in combination with the connector body 52 to have a flat and hollow housing shape.

One side of the connector body 52; i.e., a front end thereof is open to define a card-inserting opening 54. Further, a card-ejection preventing mechanism 57 is provided in the card-inserting opening 54.

The other side of the inventive card connector 50; i.e., a rear end thereof is closed and a plurality of contacts 55 are provided for the electric connection with an inserted card C such as an IC card, an SD card or a SIM card.

An outer terminal section 55b of the contact 55 projects as an external terminal and is suitably soldered and connected to the printed wiring or the printed circuit in an electronic instrument or an information terminal equipment to which is mounted the inventive card connector 50.

The difference of the inventive card connector 50 according to the second embodiment from that in the first embodiment is in that the card-stopper cap 58 is positioned by manually moving the same between the open position and the locked position, and ribs 66, 67, 68 and 69 are provided in the connector body 52 and the card-stopper cap 58.

The card C used for the inventive card connector 50, such as an IC card, an SD card or a SIM card may be the conventional one as described before.

Suitable means is provided in the inventive card connector 50 for preventing the card such as an IC card, an SD card or a SIM card from being inserted with a rear end thereof at the head or in the reversed state when the card C is inserted from the card-inserting opening 54 and for suppressing the floating-up of the inserted card.

Also, an ejector mechanism 80 may be provided in the card connector 50 for smoothly removing the inserted card C, and means for suppressing the floating-up of the card C may be provided.

As illustrated, in the inventive card connector 50, the connector body 52 is molded from an electro-insulation material such as suitable synthetic resin and combined with a cover member 53 to have a mechanical strength and a flat and hollow housing shape capable of receiving the card C. In a similar manner as in the first embodiment, the ejector mechanism 80 may be provided, including an ejector member 81 having a generally L-shape smoothly slidable along one side of the connector body 52 and an elastic member 82 such as a spring for elastically biasing the ejector member 81, so that the card C is smoothly removed from the card connector 50.

As shown in FIG. 28, the ejector mechanism 80 is adapted to press the ejector member 81 by the stored elastic force of the elastic member 82 to eject the card C. Of course, the ejector mechanism 80 is not limited to such a type but may be any other similar kind.

In this regard, as shown in FIG. 32, there is a modification in which no ejector mechanism is provided.

In this case, the card C inserted in the card connector 50 to the deepest position is maintained there by a suitable elastic contact pressure with the contact 55.

During the withdrawal, the card C is manually removed from the deepest position.

The cover member 53 of the inventive card connector 50 of the second embodiment is molded from an electro-insulation material such as suitable synthetic resin in a similar manner as in the preceding first embodiment.

The cover member 53 may be a metallic cover formed of a blanked or pressed metallic sheet such as a stainless steel sheet for the purpose of reducing a height of the card connector while maintaining a sufficient mechanical strength.

In addition, the card-inserting opening 54 is formed at a front end of the cover member 53, left and right sides of which are bent to cover the side walls 64.

A soldered terminal 70 is provided at a lateral end of the cover member 53 to be soldered and connected to the printed wiring or the printed circuit.

By using this soldered terminal 70 as a ground terminal, it is possible to ground static electricity to a ground electrode of the printed wiring or the printed circuit and eliminate a risk of static charge.

In this case, if the cover member 53 is the metallic cover, the soldered terminal 70 is can be formed integral with the cover member 53 as shown in FIG. 31, whereby the number of parts is reduced.

An opening is provided at the rear end of the cover member 53, through which a plurality of contacts 55 are projected and bent to form the terminal sections 55b as external terminals.

Thus, the card C such as an IC card, an SD card or a SIM card is inserted into the card connector 50 from the card inserting opening 54 provided at the front end of the card connector 50 and withdrawn therefrom by the built-in ejector mechanism 80.

The contact 55 has, at tip end thereof, an elastic contact piece 55a curved in an arcuate manner to be brought into contact and connected with the pad section of the card C such as an IC card, an SD card or a SIM card, and at a rear end thereof, the terminal section 55b suitably soldered and connected to the connector body of the printed circuit in the electronic instrument or the information terminal equipment.

As shown in FIGS. 21 to 28, according to the inventive card connector 50 in the second embodiment, the card-ejection preventing mechanism 57 for preventing the ejection of the card C has the card-stopper cap 58 at one end of the connector body 53 closer to the card-inserting opening 54.

The card-stopper cap 58 is disposed along a shaft 65 used as a guide rod member of the slide mechanism 56 provided between the side wall 64 and a generally central supporting wall 59 at the upper end of the connector body 52. In this embodiment, shaft 65 is inserted into holes 51a, 51b respectively formed in the side wall 64 and the supporting wall 59, as shown in FIG. 27.

In this regard, the card-stopper cap 58 is manually slidable in the lateral direction by a required distance. The card-stopper cap 58 is adapted to be manually-moved from the open position to the locked position and located at these open position and the locked position by the latch engagement using a plurality of ribs 66, 67, 68 and 69.

As illustrated, the connector body 52 has the supporting wall 59 projecting from a generally central position of the upper end, and the shaft 65 having a circular cross-section is provided between the supporting wall and the side wall 64, as a guide rod member for the slide mechanism 56. The card-stopper cap 58 is attached to the shaft 65 to be slidable along the latter.

The card-stopper cap 58 includes a body wall section 60 forming a lid body of a generally L-shaped cross-section, having a through-hole 63 at a center thereof into which is inserted the shaft 65 for the sliding, and a horizontal wall section 61 extending from the body wall section 60 in the horizontal direction.

Also, the pair of ribs 68 and 69 are provided at a gap between the both on the lower surface of the body wall section 60 in the card-stopper cap 58, and Recesses are provided between the ribs 68 and 69 and in a region outside the rib 69, respectively.

Accordingly, it is possible to move the card-stopper cap 58 in the lateral direction by these ribs 68, 69 by nipping or pushing a handle 62 in the horizontal wall section 61 with fingers.

In correspondence to the pair of ribs 68 and 69 in the card-stopper cap 58, as shown in FIG. 25, at the upper end of the connector body 52, the pair of ribs 66, 67 are projected upward in the vicinity of the supporting wall 59 at a gap between the both. Recesses are formed between the ribs 66 and 67 and in left and right regions as seen from the ribs 66, 67, respectively, so that the card-stopper cap 58 is located at the locked position and the open position by the cooperation of the ribs 66, 67 in the connector body 52 with the ribs 68, 69 in the card-stopper cap 58.

That is, when the card-stopper cap 58 is made to slide along the shaft 65, these ribs 66, 67, 68 and 69 are brought into contact with each other. When the card-stopper cap 58 is further pushed, the shaft 65 is suitably deformed due to its elasticity, whereby the rib 66, 67, 68 or 69 gets over the other.

In this case, since the ribs 66, 67, 68 and 69 are slidable without any mutual scraping, a high slide durability is obtainable.

In addition, the provision of the elastic shaft 65 and a plurality of ribs 66, 67, 68 and 69 allows users to identify the location of the card-stopper cap 58 using tactile and phonic feedback in the form of a "click." When sliding the card-stopper cap 58, a user can sense that the card-stopper cap 58 has moved from the locked position by feeling and hearing the click created by the relative movement of ribs 66, 67, 68, 69.

Also, upon the movement of the card-stopper cap 58, the open position and the locked position is properly determined by one of the side walls 64 and the central supporting wall 59.

Regarding the ribs 66, 67, 68 and 69, two ribs 66 and 67 may be provided for determining the open position and the locked position on either one of the connector body 52 and the card-stopper cap 58, and at least one rib 68 may be provided on the other. If necessary, two ribs 68 and 69 may be provided on the other.

In the inventive card connector 50 of the second embodiment thus structured, since the shaft 65 is deformable due to its elasticity when the card-stopper cap 58 is made to slide, the ribs 66, 67, 68 and 69 are slidable without any mutual scraping, whereby a high slide durability and a high resistance to wear are obtainable.

By combining the elastic shaft 65 with the ribs 66, 67, 68 and 69, a click is generated by the latch engagement when the card-stopper cap 58 is made to slide whereby it is possible to give notice that the locked position or the open position of the card-stopper cap 58 is reached, or to suitably locate the card-stopper cap 58 at the required locked position or open position.

The inventive card connector 50 having the card-ejection preventing mechanism 57 in the second embodiment is used in the following manner.

First, when the card C is normally inserted into the card connector 50 from the card-inserting opening 54 from a state shown in FIG. 21 in which the card C has not yet been mounted and the card-stopper cap 58 is at the open position, the card C is in a state shown in FIG. 22.

When the card C is further pushed into the card connector from the state shown in FIG. 22 to be a state shown in FIG. 23, the handle 62 of the horizontal wall section 61 in the card-stopper cap 58 is operated by fingers to slide the card-stopper cap 58 at the open position to be brought into contact with the supporting wall 59, whereby the card-locked state shown in FIG. 24 is obtained in which the horizontal wall section 61 of the card-stopper cap 58 is locked with the upper end of the card C.

Thus, since the ejection of the card C is prevented by the card-stopper cap 58 in the card-locked state, the card C is inhibited from being carelessly ejected from the card connector.

In this state, similar to the above-mentioned first embodiment, the elastic member 82 is compressed in the ejector mechanism 80 shown in FIG. 28 built-in in the card connector 50 and the card C is firmly locked by the card-stopper cap 58.

In this case, when the card-stopper cap 58 moves from the open position to the locked position, the ribs 68 and 69 of the card-stopper cap 58 are latch-engaged with the ribs 66 and 67 of the connector body 52 to generate a click sound, informing that the card-stopper cap 58 is firmly located by the ribs 66, 67, 68 and 69 at the locked position in which it is brought into contact with the supporting wall 59.

Thus, even if the card connector 50 is carelessly dropped down in the card-locked state, the ejection of the card C due to the shock or the vibration is prevented by the card-ejection preventing mechanism 57, whereby the card C is favorably protected.

Since the ejection of the card C is prevented by the card-ejection preventing mechanism 57 unless the card-stopper cap 58 is intentionally opened, it is possible to always bring the contact portion into contact with the card pad section without coming off from the latter and prevent the occurrence of read error and the ejection of the card C.

In the card-locked state shown in FIG. 24, since the card C is liable to be ejected due to a load applied in the ejecting direction by the elastic member 82 such as a spring, the ejection of the card C is inhibited by the card-stopper cap 58, and the card C is maintained in the card-locked state.

In the card-locked state, when the card-stopper cap 58 is manually operated in the opening direction, the card-stopper cap 58 moves from the state shown in FIG. 24 to that shown in FIG. 23 along the shaft 65 to be come off from the upper end of the card C.

As a result, the card C is ejected from the card connector 50 by the elastic force of the built-in elastic member 82.

Also in this case, when the card-stopper cap 58 moves to the open position, a click sound is generated as the ribs 68 and 69 in the card-stopper cap 58 ride over the ribs 66 and 67 in the connector body 52. This click informs the user that the card-stopper cap is located at the open position.

As described above, the connector 50 in this embodiment is formed of the connector body 52 and the metallic cover member 53 in combination with the former to have a flat and hollow housing shape, and the card-ejection preventing mechanism 57 having the card-stopper cap 58 slidable in the lateral direction along the card-inserting opening 54 is provided.

Thus, it is possible to favorably prevent the ejection of the card C due to the shock when the card connector 50 is erroneously dropped down, whereby the card C is protected from the damage. Also, since the contact portion does not come off from the card pad section, no read error occurs.

As apparent from the above description, according to the inventive card connector, by providing the card-ejection preventing mechanism having the card-stopper cap slidable along the card-inserting opening, the ejection of the card is prevented due to the vibration of the shock, whereby the coming-off of the contact portion from the card pad section is inhibited.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A card connector comprising:
   a connector body,
   a cover member in combination with the connector body,
   contact terminals arranged in the connector body, and
   a card-ejection preventing mechanism provided in a card-inserting opening of the connector body, wherein the card-ejection preventing mechanism comprises:
   a support provided in the connector body,
   a hole provided at a predetermined position of the support,
   a pin inserted into the hole, and
   a card-stopper cap slidable along the pin.

2. A card connector as defined by claim 1, wherein the card-ejection preventing mechanism further comprises:
   a first projection provided on the connector body, and
   a second projection provided on the card-stopper cap.

3. A card connector as defined by claim 1, wherein the connector body comprises
   an ejector mechanism for removing the card from the card connector.

4. A card connector as defined by claim 1, wherein a ground terminal is provided at an end of the connector body.

5. A card connector as defined by claim 4, wherein the ground terminal is a soldered terminal.

6. A card connector as defined by claim 1, wherein the cover member is made of a metallic plate.

7. A card connector as defined by claim 4, wherein the ground terminal is formed in one piece with the cover member.

8. A card connector as defined by claim 7, wherein the ground terminal is a soldered terminal.

9. A card connector as defined by claim 4, wherein the first projection contacts the second projection when the card-stopper cap slides along the pin.

10. A card connector as defined by claim 1, wherein the pin is configured to elastically deform.

* * * * *